US012230982B2

(12) United States Patent
Kamel Ahmed et al.

(10) Patent No.: US 12,230,982 B2
(45) Date of Patent: Feb. 18, 2025

(54) STATE-OF-CHARGE BALANCING WITH PARALLEL AND SERIES OUTPUT CONNECTED BATTERY POWER MODULES

(71) Applicants: Mohamed Ahmed Kamel Ahmed, Rochester, MI (US); Regan A. Zane, Hyde Park, UT (US); Dragan Maksimovic, Boulder, CO (US)

(72) Inventors: Mohamed Ahmed Kamel Ahmed, Rochester, MI (US); Regan A. Zane, Hyde Park, UT (US); Dragan Maksimovic, Boulder, CO (US)

(73) Assignees: Utah State University, Logan, UT (US); University of Colorado Boulder, Boulder, CO (US)

( * ) Notice: Subject to any disclaimer, the term of this patent is extended or adjusted under 35 U.S.C. 154(b) by 643 days.

(21) Appl. No.: 17/529,962

(22) Filed: Nov. 18, 2021

(65) Prior Publication Data

US 2022/0393485 A1 Dec. 8, 2022

Related U.S. Application Data

(63) Continuation-in-part of application No. 17/350,880, filed on Jun. 17, 2021, now Pat. No. 11,735,782.
(Continued)

(51) Int. Cl.
*H02J 7/00* (2006.01)
*H01M 10/42* (2006.01)
(Continued)

(52) U.S. Cl.
CPC ......... *H02J 7/0016* (2013.01); *H01M 10/425* (2013.01); *H01M 10/441* (2013.01);
(Continued)

(58) Field of Classification Search
CPC .... H02J 7/0016; H02J 7/0048; H02J 7/00712; H01M 10/425; H01M 10/441;
(Continued)

(56) References Cited

U.S. PATENT DOCUMENTS

| 6,664,762 B2 * | 12/2003 | Kutkut | ............... H02M 3/33561 |
| | | | 320/116 |
| 7,944,662 B2 | 5/2011 | Carkner | |
| (Continued) | | | |

FOREIGN PATENT DOCUMENTS

| CN | 102916440 B | 6/2013 | |
| CN | 107696863 A | 2/2018 | |
| GB | 2541352 A * | 2/2017 | ................ B60L 1/00 |

OTHER PUBLICATIONS

Kamel et al., State-of-Charge Control with Series Output Connected DC-DC Modules in Active Battery Management Systems, 2020 IEEE Applied Power Electronics Conference and Exposition (APEC), 2020, pp. 3081-3086, IEEE, United States.
(Continued)

*Primary Examiner* — M Baye Diao
(74) *Attorney, Agent, or Firm* — Kunzler Bean & Adamson; Bruce R. Needham

(57) ABSTRACT

An apparatus includes a battery pack with N battery bricks, each with a DC output voltage. The output of each brick is connected in series providing a bus voltage. Each brick includes battery power modules ("BPMs") connected in parallel and each connected to a battery cell. Each BPM charges/discharges the connected battery cell. Each brick has a battery brick controller that provides a control signal to each brick's BPMs. A control signal of a BPM is derived from a BPM error signal that includes a battery cell current of the battery cell of BPM subtracted from a summation of an average current signal, a local droop current and a balancing current. The balancing current is based on a
(Continued)

current SOC of the battery cell connected to the BPM and a desired SOC for the battery cell connected to the BPM. A BMS derives the balancing current for the BPMs.

20 Claims, 10 Drawing Sheets

Related U.S. Application Data

(60) Provisional application No. 63/040,431, filed on Jun. 17, 2020.

(51) Int. Cl.
*H01M 10/44* (2006.01)
*H01M 10/48* (2006.01)
*H01M 50/204* (2021.01)
*H01M 50/509* (2021.01)

(52) U.S. Cl.
CPC ....... *H01M 10/482* (2013.01); *H01M 50/204* (2021.01); *H01M 50/509* (2021.01); *H02J 7/0048* (2020.01); *H02J 7/00712* (2020.01); *H01M 2010/4271* (2013.01)

(58) Field of Classification Search
CPC ............. H01M 10/482; H01M 50/204; H01M 50/509; H01M 2010/4271
USPC .......................................... 320/118
See application file for complete search history.

(56) References Cited

U.S. PATENT DOCUMENTS

| | | | | |
|---|---|---|---|---|
| 9,005,788 B2* | 4/2015 | Zhu | ..................... | H01M 10/617 320/124 |
| 9,118,192 B2* | 8/2015 | Zhu | ..................... | H02J 7/00304 |
| 9,368,991 B2* | 6/2016 | Qahouq | ................. | H02J 7/0018 |
| 9,577,530 B1* | 2/2017 | Ribarich | ............. | H02M 3/1588 |
| 10,003,214 B2* | 6/2018 | Nasiri | ...................... | H02J 9/061 |
| 10,122,186 B2* | 11/2018 | Nystrom | ............... | H02J 7/0016 |
| 10,442,309 B2* | 10/2019 | Goetz | ................. | H02M 3/1582 |
| 10,873,201 B2* | 12/2020 | Cha | .................... | H02J 7/007184 |
| 11,070,068 B2* | 7/2021 | Singer | ................. | H01M 10/443 |
| 11,245,268 B1* | 2/2022 | Trippel | ............... | H02J 7/00032 |
| 11,469,661 B2* | 10/2022 | King | ..................... | H02J 7/0063 |
| 2012/0223677 A1* | 9/2012 | Yamauchi | ................. | H02J 7/34 320/134 |
| 2019/0123394 A1* | 4/2019 | Cha | ........................ | H01M 10/48 |
| 2019/0168632 A1* | 6/2019 | Deng | ...................... | B60L 50/64 |

OTHER PUBLICATIONS

Kamel et al., Voltage Sharing with Series Output Connected Battery Modules in a Plug-and-Play DC Microgrid, IEEE Transactions on Power Electronics, Apr. 29, 2021, IEEE, United States.
Brivio et al., Battery energy storage system for primary control reserve and energy arbitrage, Sustainable Energy, Grid and Networks, Apr. 1, 2016, pp. 152-165, vol. 6.
Li et al., Design and test of a new droop control algorithm for a SMES/battery hybrid energy storage system, Energy, Nov. 5, 2016, pp. 1110-1122, vol. 118.
U.S. Appl. No. 17/350,880, filed Jun. 17, 2021, Notice of Allowance mailed Jun. 5, 2023.
Qian et al., "A high-efficiency grid-tie battery energy storage system," in IEEE Transactions on Power Electronics, vol. 26, Issue No. 3, pp. 886-896, Publication date Dec. 3, 2010.
Chowdhury et al., "Adaptive Cell Balancing of Series Connected Batteries Using Hybrid Droop Controller," 2020 IEEE Applied Power Electronics Conference and Exposition (APEC), New Orleans, LA, USA, 2020, pp. 1668-1672, Publication Mar. 2020.
U.S. Appl. No. 17/350,880, filed Jun. 17, 2021, Office Action mailed Feb. 8, 2023.

* cited by examiner (a)

(b)

STATE-OF-CHARGE BALANCING WITH PARALLEL AND SERIES OUTPUT CONNECTED BATTERY POWER MODULES

CROSS-REFERENCES TO RELATED APPLICATIONS

This is a continuation-in-part application of and claims priority to U.S. patent application Ser. No. 17/350,880 entitled "VOLTAGE SHARING OF SERIES CONNECTED BATTERY MODULES IN A PLUG-AND-PLAY DC MICROGRID" and filed on Jun. 17, 2021 for Mohamed Ahmed Kamel Ahmed et. al., which claims priority to U.S. Provisional Patent Application No. 63/040,431 entitled "VOLTAGE SHARING OF SERIES CONNECTED BATTERY MODULES IN A PLUG-AND-PLAY DC MICROGRID" and filed on Jun. 17, 2020 for Mohamed Ahmed Kamel Ahmed et. al., which are incorporated herein by reference.

GOVERNMENT RIGHTS

This invention was made with government support under contract #N00014-16-1-2986 awarded by the Office of Naval Research. The government has certain rights in the invention.

FIELD

This invention relates to parallel and series output connected battery power modules and more particularly relates to state-of-charge balancing with parallel and series output connected battery power modules.

BACKGROUND

Lithium-Ion battery cells and other similar batteries have a relatively low terminal voltage compared to typical high-voltage ("HV") applications. A typical battery pack often utilizes groups of parallel and series connected cells to increase the overall capacity and voltage. However, non-uniform heat distribution and intrinsic cell mismatches contribute to unequal state-of-health ("SOH") degradation among the cells, where the role of a battery management system ("BMS") and state-of-charge ("SOC") balancing algorithms are critical. Thus, battery packs often employ balancing circuits to control the cells' SOCs.

SUMMARY

An apparatus for modulating battery cell current includes a battery pack that includes a plurality of N battery bricks ("bricks"). An output of each of the N bricks of the battery pack includes a direct current ("DC") output voltage. Output terminals of each of the N bricks are connected in series and provide a bus voltage. Each of the N bricks includes a plurality of m battery power modules ("BPMs"). Each of the m BPMs has a DC output voltage. Terminals of each of the m BPMs is connected in parallel and together provide the output voltage of each of the N bricks and each of the m BPMs of a $j^{th}$ brick of the N bricks has an input connected to a battery cell. Each of an $i^{th}$ BPM of the m BPMs is controllable to charge and discharge the battery cell connected to the $i^{th}$ BPM. The apparatus includes a battery brick controller for each of the N bricks. The battery brick controller for each of a $j^{th}$ brick of the N bricks is configured to provide a control signal to each of the m BPMs of the $j^{th}$ brick. A control signal of an $i^{th}$ BPM of the m BPMs of the $j^{th}$ brick is derived from a BPM error signal that includes a battery cell current of the battery cell connected to the $i^{th}$ BPM subtracted from a summation of an average current signal, a local droop current and a balancing current. The balancing current is based on a current SOC of the battery cell connected to the $i^{th}$ BPM and a desired SOC for the battery cell connected to the $i^{th}$ BPM. The apparatus includes a BMS configured to derive the balancing current for each of the m BPMs of the N bricks of the battery pack.

Another apparatus for modulating battery cell current includes a battery pack with a plurality of P modular subsystems. Each modular subsystem k of the P modular subsystems includes a plurality of N battery bricks ("bricks"). An output of each of the N bricks of the battery pack includes a DC output voltage. Output terminals of each of the N bricks are connected in series and provide a bus voltage. Each of the N bricks includes a plurality of m BPMs. Each of the m BPMs has a DC output voltage. Output terminals of each of the m BPMs are connected in parallel and together provide the output voltage of each of the N bricks and each of the m BPMs of a $j^{th}$ brick of the N bricks has an input connected to a battery cell. Each of an $i^{th}$ BPM of the m BPMs is controllable to charge and discharge the battery cell connected to the $i^{th}$ BPM. The apparatus includes a battery brick controller for each of the N bricks of the P modular subsystems. The battery brick controller for each of a $j^{th}$ brick of the N bricks is configured to provide a control signal to each of the m BPMs of the $j^{th}$ brick. A control signal of an $i^{th}$ BPM of the m BPMs of the $j^{th}$ brick is derived from a BPM error signal that includes a battery cell current of the battery cell connected to the $i^{th}$ BPM subtracted from a summation of an average current signal, a local droop current and a balancing current. The balancing current is based on a current state-of-charge ("SOC") of the battery cell connected to the $i^{th}$ BPM and a desired SOC for the battery cell connected to the $i^{th}$ BPM. The apparatus includes a BMS configured to derive the balancing current for each of the m BPMs of the N bricks of the P modular subsystems the battery pack.

Another apparatus for modulating battery cell current includes a battery pack with a plurality of N bricks. An output of each of the N bricks of the battery pack has a DC output voltage and output terminals of each of the N bricks are connected in series and provide a bus voltage. Each of the N bricks has a plurality of m BPMs. Each of the m BPMs has a DC output voltage. Output terminals of each of the m BPMs is connected in parallel and together provide the output voltage of each of the N bricks and each of the m BPMs of a $j^{th}$ brick of the N bricks has an input connected to a battery cell, wherein each of an $i^{th}$ BPM of the m BPMs is controllable to charge and discharge the battery cell connected to the $i^{th}$ BPM. The apparatus includes a battery brick controller for each of the N bricks, the battery brick controller for each of a $j^{th}$ brick of the N bricks is configured to provide a control signal to each of the m BPMs of the $j^{th}$ brick. A control signal of an $i^{th}$ BPM of the m BPMs of the $j^{th}$ brick is derived from a BPM error signal that includes a battery cell current of the battery cell connected to the $i^{th}$ BPM subtracted from a summation of an average current signal, a local droop current and a balancing current, the balancing current based on a current SOC of the battery cell connected to the $i^{th}$ BPM and a desired SOC for the battery cell connected to the $i^{th}$ BPM.

The apparatus includes a BMS configured to derive the balancing current for each of the m BPMs of the N bricks of the battery pack. For each BPM of the m BPMs of the N bricks, the BMS derives the balancing current for an $i^{th}$, BPM of the m BPMs of the N bricks of the battery pack from current and voltage measurements from the battery cell connected to the $i^{th}$ BPM, the bus voltage, and a target SOC of the battery pack. The local droop current is a product of a droop conductance and an error signal derived from an average voltage subtracted from the output voltage of the $j^{th}$ brick of the N bricks controlled by the battery brick controller. The average voltage comprises the bus voltage divided by the number of bricks N. The average current signal is a product of a SOC compensator and a difference between an average SOC and a SOC reference signal. The average SOC is a total of the SOC for each battery cell connected to a BPM of the m BPMs of the N bricks of the battery pack divided by the number of BPMs mN of the battery pack and the SOC reference signal is derived from a target SOC of the battery pack.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
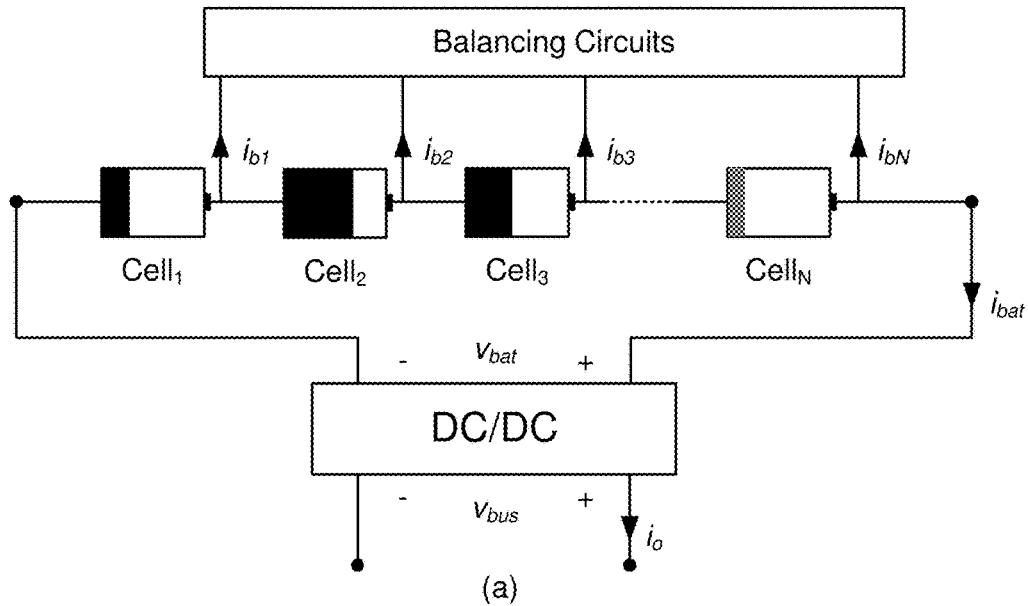
FIG. 1 is a schematic block diagram illustrating different architectures for a high voltage battery pack where (a) is typical approach with a central DC/DC converter, (b) is battery pack utilizing N series output connected BPMs, and (c) is battery pack employing N series output connected battery bricks with m paralleled BPMs in each.
Figure 1:
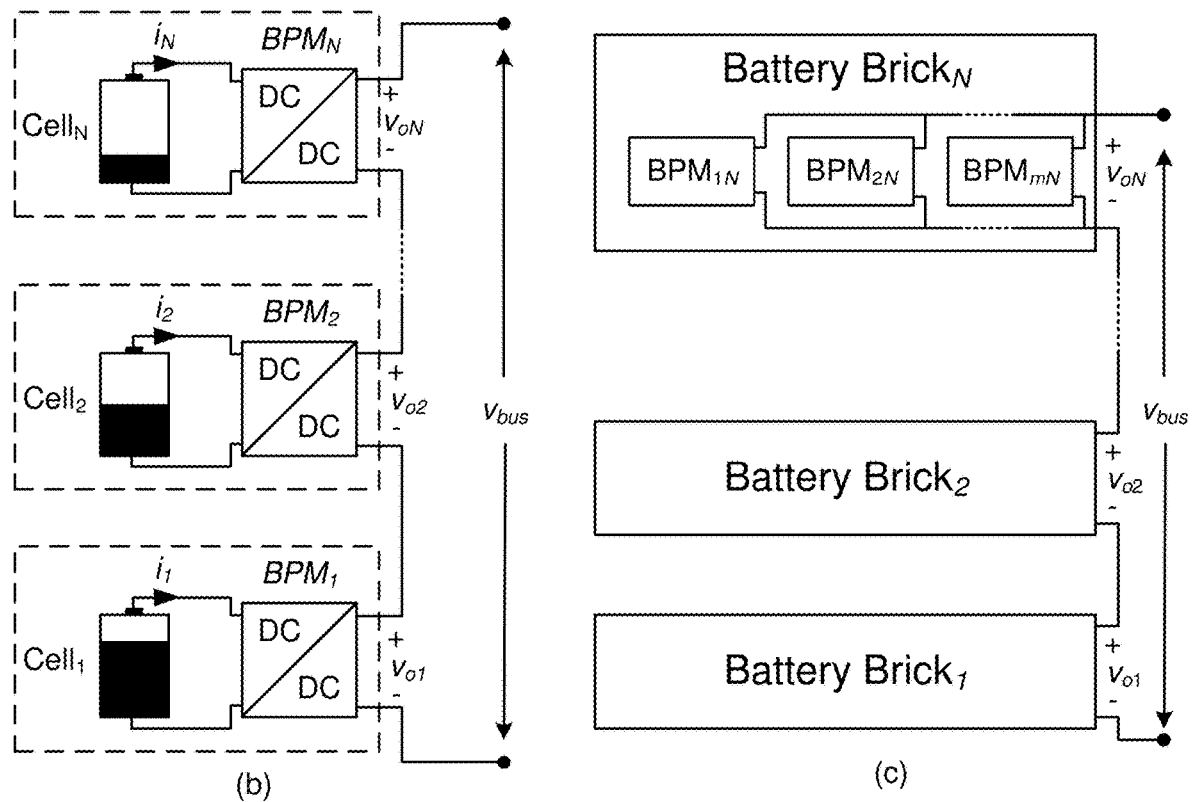

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

An apparatus for modulating battery cell current includes a battery pack that includes a plurality of N battery bricks ("bricks"). An output of each of the N bricks of the battery pack includes a direct current ("DC") output voltage. Output terminals of each of the N bricks are connected in series and provide a bus voltage. Each of the N bricks includes a plurality of m battery power modules ("BPMs"). Each of the m BPMs has a DC output voltage. Terminals of each of the m BPMs is connected in parallel and together provide the output voltage of each of the N bricks and each of the m BPMs of a $j^{th}$ brick of the N bricks has an input connected to a battery cell. Each of an $i^{th}$ BPM of the m BPMs is controllable to charge and discharge the battery cell connected to the $i^{th}$ BPM. The apparatus includes a battery brick controller for each of the N bricks. The battery brick controller for each of a $j^{th}$ brick of the N bricks is configured to provide a control signal to each of the m BPMs of the $j^{th}$ brick. A control signal of an $i^{th}$ BPM of the m BPMs of the $j^{th}$ brick is derived from a BPM error signal that includes a battery cell current of the battery cell connected to the $i^{th}$ BPM subtracted from a summation of an average current signal, a local droop current and a balancing current. The balancing current is based on a current SOC of the battery cell connected to the $i^{th}$ BPM and a desired SOC for the battery cell connected to the $i^{th}$ BPM. The apparatus includes a BMS configured to derive the balancing current for each of the m BPMs of the N bricks of the battery pack.

In some embodiments, for each BPM of the m BPMs of the N bricks, the BMS derives the balancing current for an $i^{th}$ BPM of the m BPMs of the N bricks of the battery pack from current and voltage measurements from the battery cell connected to the $i^{th}$ BPM, the bus voltage, and a target SOC of the battery pack. In other embodiments, the local droop current includes a product of a droop conductance and an error signal derived from an average voltage subtracted from the output voltage of the $j^{th}$ brick of the N bricks controlled by the battery brick controller. The average voltage is the bus voltage divided by the number of bricks N.

In some embodiments, the average current signal is a product of a SOC compensator and a difference between an average SOC and a SOC reference signal. The average SOC is a total of the SOC for each battery cell connected to a BPM of the m BPMs of the N bricks of the battery pack divided by the number of BPMs mN of the battery pack and the SOC reference signal is derived from a target SOC of the battery pack. In other embodiments, the SOC reference signal scales linearly with the bus voltage over a first voltage range for charging of the battery cells of the battery pack and scales linearly with the bus voltage over a second voltage range for discharging of the battery cells of the battery pack. The first voltage range is below the second voltage range and the first voltage range and the second voltage range are within an overall voltage regulation range of the bus voltage.

In some embodiments, the balancing current for an $i^{th}$ BPM of a $j^{th}$ brick is derived from scalar configured to limit output current of the BPMs, the average current signal, a SOC of the battery cells connected to the m BPMs of the $j^{th}$ brick, and a SOC of the battery cell connected to the $i^{th}$ BPM. In other embodiments, the average current signal is positive for discharging the battery cells of the battery pack and negative for charging the battery cells of the battery pack and the balancing current for the $i^{th}$ BPM of the m BPMs connected in parallel of a $j^{th}$ brick of the N bricks is positive when the average current signal is positive and negative. In other embodiments, the balancing current scales linearly with the average current signal. In other embodiments, the balancing current of a $DPM_{ij}$ $\Delta I_{ij}$ is:

$$\Delta I_{ij} = \alpha \cdot i_{all} \frac{\delta SOC_j}{SOC_{brick,max}} + \alpha \cdot |i_{all}| \frac{\delta SOC_{ij}}{SOC_{MaxCell,j}} \forall\ j \in N,\ \in m$$

where:
$\alpha$ is the scalar;
$i_{all}$ is the average current signal;

$\delta SOC_j = SOC_j - SOC_{avg} \forall j \in N$;

$SOC_j$ is the SOC for brick j of the N bricks of the battery pack;
$SOC_{avg}$ is an average SOC of all battery cells of the battery pack;
$SOC_{brick,max}$ an absolute maximum difference between the SOC of brick j of the N bricks and the average SOC;

$\delta SOC_{ij} = SOC_{ij} - SOC_j \forall j \in N, i \in m$;

$SOC_{ij}$ is the SOC of the battery cell connected to BPM i of m BPMs of the brick j; and
$SOC_{MaxCell,j}$ is the absolute maximum difference between the SOC of a battery cell connected to BPM i of m BPMs of the brick j and $SOC_j$.

In some embodiments, each BPM is a DC-to-DC converter with switches and the control signal comprises a duty cycle for the switches. In other embodiments, the battery pack also includes P modular subsystems where each modular subsystem includes N bricks and the P modular subsystems are connected in one of series or parallel.

Another apparatus for modulating battery cell current includes a battery pack with a plurality of P modular subsystems. Each modular subsystem k of the P modular subsystems includes a plurality of N battery bricks ("bricks"). An output of each of the N bricks of the battery pack includes a DC output voltage. Output terminals of each of the N bricks are connected in series and provide a bus voltage. Each of the N bricks includes a plurality of m BPMs. Each of the m BPMs has a DC output voltage. Output terminals of each of the m BPMs are connected in parallel and together provide the output voltage of each of the N bricks and each of the m BPMs of a $j^{th}$ brick of the N bricks has an input connected to a battery cell. Each of an $i^{th}$ BPM of the m BPMs is controllable to charge and discharge the battery cell connected to the $i^{th}$ BPM. The apparatus includes a battery brick controller for each of the N bricks of the P modular subsystems. The battery brick controller for each of a $j^{th}$ brick of the N bricks is configured to provide a control signal to each of the m BPMs of the $j^{th}$ brick. A control signal of an $i^{th}$ BPM of the m BPMs of the $j^{th}$ brick is derived from a BPM error signal that includes a battery cell current of the battery cell connected to the $i^{th}$ BPM subtracted from a summation of an average current signal, a local droop current and a balancing current. The balancing current is based on a current state-of-charge ("SOC") of the battery cell connected to the $i^{th}$ BPM and a desired SOC for the battery cell connected to the $i^{th}$ BPM. The apparatus includes a BMS configured to derive the balancing current for each of the m BPMs of the N bricks of the P modular subsystems the battery pack.

In some embodiments, for each BPM of the m BPMs of the N bricks of the P modular subsystems, the BMS derives the balancing current for an $i^{th}$ BPM of the m BPMs of the N bricks of the P modular subsystems of the battery pack from current and voltage measurements from the battery cell connected to the $i^{th}$ BPM, the bus voltage, and a target SOC of the battery pack. In other embodiments, the local droop current is a product of a droop conductance and an error signal derived from an average voltage subtracted from the output voltage of the $j^{th}$ brick of the N bricks controlled by the battery brick controller. The average voltage is the bus voltage divided by NP when the P modular subsystems are connected in series and is the bus voltage divided by N when the P modular subsystems are connected in parallel.

In some embodiments, the average current signal is a product of a SOC compensator and a difference between an average SOC and a SOC reference signal. The average SOC is a total of the SOC for each battery cell connected to a BPM of the m BPMs of the N bricks of the P modular subsystems of the battery pack divided by the number of BPMs mNP of the battery pack and the SOC reference signal is derived from a target SOC of the battery pack. In other embodiments, the SOC reference signal scales linearly with the bus voltage over a first voltage range for charging of the battery cells of the battery pack and scales linearly with the bus voltage over a second voltage range for discharging of the battery cells of the battery pack. The first voltage range is below the second voltage range and the first voltage range and the second voltage range are within an overall voltage regulation range of the bus voltage.

In some embodiments, the balancing current for an $i^{th}$ BPM of a $j^{th}$ brick of a $k^{th}$ modular subsystem is derived from scalar configured to limit output current of the BPMs, the average current signal, a SOC of the battery cells connected to the m BPMs of the $j^{th}$ brick of the $k^{th}$ modular subsystem, and a SOC of the battery cell connected to the $i^{th}$ BPM. In other embodiments, the average current signal is positive for discharging the battery cells of the battery pack and negative for charging the battery cells of the battery pack and the balancing current for the $i^{th}$ BPM of the m BPMs connected in parallel of a $j^{th}$ brick of the N bricks of a $k^{th}$ modular subsystem is positive when the average current signal is positive and negative. In other embodiments, the balancing current of the $ijk^{th}$ DPM $\Delta I_{ijk}$ is:

$$\Delta I_{ijk} = \begin{cases} \alpha i_{all} \dfrac{SOC_k - SOC_{avg}}{\max_{k \in P}\{|SOC_k - SOC_{avg}|\}} + \alpha i_{all} \dfrac{SOC_{jk} - SOC_k}{\max_{j \in N}\{|SOC_{jk} - SOC_k|\}} \\ + \alpha |i_{all}| \dfrac{SOC_{ijk} - SOC_{jk}}{\max_{i \in m}\{|SOC_{ijk} - SOC_{jk}|\}}, \text{Series modular subsystems} \\ \alpha |i_{all}| \dfrac{SOC_k - SOC_{avg}}{\max_{k \in P}\{|SOC_k - SOC_{avg}|\}} + \alpha i_{all} \dfrac{SOC_{jk} - SOC_k}{\max_{j \in N}\{|SOC_{jk} - SOC_k|\}} \\ + \alpha |i_{all}| \dfrac{SOC_{ijk} - SOC_{jk}}{\max_{i \in m}\{|SOC_{ijk} - SOC_{jk}|\}}, \text{Parallel modular subsystems} \end{cases}$$

where:

$\alpha$ is the scalar;

$i_{all}$ is the average current signal;

$SOC_k$ is the SOC for modular subsystem k of the P modular subsystems of the battery pack;

$SOC_{jk}$ is the SOC for the $j^{th}$ brick of the $k^{th}$ modular subsystem of the battery pack;

$SOC_{ijk}$ is the SOC of the battery cell connected to the $i^{th}$ BPM of $j^{th}$ brick of the $k^{th}$ modular subsystem;

$SOC_{avg}$ is an average SOC of all battery cells of the battery pack;

$\max_{k \in P}\{|SOC_k - SOC_{avg}|\}$ is an absolute maximum difference between the SOC of the $k^{th}$ modular subsystem and the average SOC;

$\max_{j \in N}\{|SOC_{jk} - SOC_k|\}$ is an absolute maximum difference between the SOC of the $j^{th}$ brick of the $k^{th}$ modular subsystem and the SOC of the $k^{th}$ modular subsystem; and $\max_{i \in m}\{|SOC_{ijk} - SOC_{jk}|\}$ is the absolute maximum difference between the SOC of the battery cell connected to the $i^{th}$ BPM of the $j^{th}$ brick of the $k^{th}$ modular subsystem and SOC of the $j^{th}$ brick of the $k^{th}$ modular subsystem.

Another apparatus for modulating battery cell current includes a battery pack with a plurality of N bricks. An output of each of the N bricks of the battery pack has a DC output voltage and output terminals of each of the N bricks are connected in series and provide a bus voltage. Each of the N bricks has a plurality of m BPMs. Each of the m BPMs has a DC output voltage. Output terminals of each of the m BPMs is connected in parallel and together provide the output voltage of each of the N bricks and each of the m BPMs of a $j^{th}$ brick of the N bricks has an input connected to a battery cell, wherein each of an $i^{th}$ BPM of the m BPMs is controllable to charge and discharge the battery cell connected to the $i^{th}$ BPM. The apparatus includes a battery brick controller for each of the N bricks, the battery brick controller for each of a $j^{th}$ brick of the N bricks is configured to provide a control signal to each of the m BPMs of the $j^{th}$ brick. A control signal of an $i^{th}$ BPM of the m BPMs of the $j^{th}$ brick is derived from a BPM error signal that includes a battery cell current of the battery cell connected to the $i^{th}$ BPM subtracted from a summation of an average current signal, a local droop current and a balancing current, the balancing current based on a current SOC of the battery cell connected to the $i^{th}$ BPM and a desired SOC for the battery cell connected to the $i^{th}$ BPM.

The apparatus includes a BMS configured to derive the balancing current for each of the m BPMs of the N bricks of the battery pack. For each BPM of the m BPMs of the N bricks, the BMS derives the balancing current for an $i^{th}$ BPM of the m BPMs of the N bricks of the battery pack from current and voltage measurements from the battery cell connected to the $i^{th}$ BPM, the bus voltage, and a target SOC of the battery pack. The local droop current is a product of a droop conductance and an error signal derived from an average voltage subtracted from the output voltage of the $j^{th}$ brick of the N bricks controlled by the battery brick controller. The average voltage comprises the bus voltage divided by the number of bricks N. The average current signal is a product of a SOC compensator and a difference between an average SOC and a SOC reference signal. The average SOC is a total of the SOC for each battery cell connected to a BPM of the m BPMs of the N bricks of the battery pack divided by the number of BPMs mN of the battery pack and the SOC reference signal is derived from a target SOC of the battery pack.

In some embodiments, the balancing current of a $DPM_{ij} \Delta I_{ij}$ is:

$$\Delta I_{ij} = \alpha \cdot i_{all} \dfrac{\delta SOC_j}{SOC_{brick,max}} + \alpha \cdot |i_{all}| \dfrac{\delta SOC_{ij}}{SOC_{MaxCell,j}} \forall \; j \in N, \in m$$

where:

α is the scalar;

$i_{all}$ is the average current signal;

$$\delta SOC_j = SOC_j - SOC_{avg} \forall j \in N;$$

$SOC_j$ is the SOC for brick j of the N bricks of the battery pack;

$SOC_{avg}$ is an average SOC of all battery cells of the battery pack;

$SOC_{brick,max}$ an absolute maximum difference between the SOC of brick j of the N bricks and the average SOC;

$$\delta SOC_{ij} = SOC_{ij} - SOC_j \forall j \in N, i \in m;$$

$SOC_{ij}$ is the SOC of the battery cell connected to BPM i of m BPMs of the brick j; and $SOC_{MaxCell,j}$ is the absolute maximum difference between the SOC of a battery cell connected to BPM i of m BPMs of the brick j and $SOC_j$.

I. Introduction

FIG. 1(a) shows N series-connected cells that form a battery pack that is interfaced to a high voltage DC ("HVDC") bus through a DC/DC converter. The $k^{th}$ cell current is the superposition of two components, i.e., $i_k = i_{bat} + i_{bk}$. The common battery current $i_{bat}$ flows into the DC/DC converter. However, $i_{bk}$ is a unique current for each cell that flows into the balancing circuits to regulate the SOC of the cell $SOC_k$. The balancing circuits can be categorized as dissipative or non-dissipative. Dissipative balancing is relatively simple, inexpensive, and inefficient, where the highest SOC cell dissipates energy in a resistor. However, excess energy is conserved with non-dissipative balancing that is more efficient and expensive.

A battery power module ("BPM") is a DC/DC converter that interfaces an individual battery cell to the DC bus, where the entire cell current flows through the converter, enabling individual cell-level control and non-dissipative balancing. Series output connected BPMs are an emerging solution to replace the HV DC/DC converters in a large battery packs, as shown in FIG. 1(b). SOC balancing between the N series output connected BPMs has been presented, where the BMS regulates the output voltages of the modules. However, the battery pack and the individual BPMs appear as voltage sources that degrade the overall design modularity and paralleling capabilities. A decentralized solution is presented, where all BPMs regulate their output currents. However, the BPMs require output current sensing, and system operation is susceptible to the DC bus disturbances.

Increasing the battery pack capacity is feasible by employing m parallel output connected BPMs that form a brick, where N series output connected bricks achieve the desired HV bus, as shown in FIG. 1(c). Balancing between the m parallel and N series output connected BPMs is demonstrated, as shown in FIG. 1(c). The BMS balances the N series output connected bricks by regulating their output voltages. Within a brick, the m paralleled BPMs utilize a common output voltage loop that generates a reference duty cycle $d_{vN}$; however, m distinct SOC balancing compensators scale the reference duty cycle $d_{vN}$ to achieve balancing between the BPMs.

The present application presents a simple solution to achieve individual cell SOC control with m parallel and N series output connected BPMs. The balancing strategy relies on differential input current regulation in all BPMs until SOC balancing is achieved. The input current references in the bricks are introduced to track the average SOC of the entire battery pack $SOC_{avg}$, ensuring SOC balancing among the N series connected battery bricks. However, the current references within the bricks ensure that the BPMs track the average SOC of the brick. Consequently, hierarchical SOC balancing between the series and parallel BPMs is achieved. Therefore, the battery pack behaves as a variable current source, which improves modularity and the paralleling capabilities of the entire battery system. Moreover, the SOC balancing approach relies on the input current sensing circuit that the BMS balancing algorithms utilize. The SOC balancing approach relies on the input current sensing circuit, reducing the system cost and complexity.

II. System Description and Control Architecture

Figure 2:
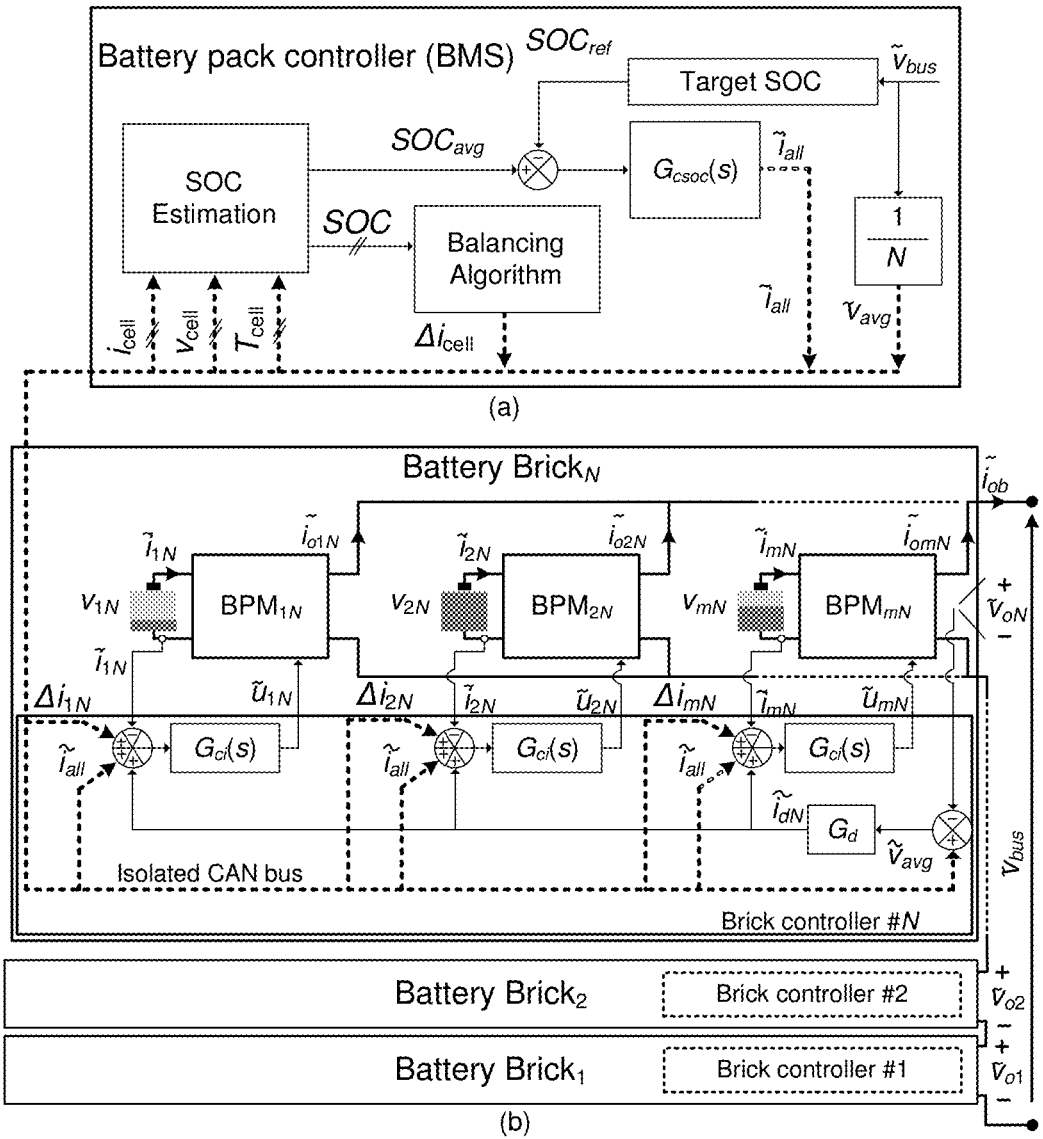
FIG. 2 is a schematic block diagram illustrating one embodiment of a system-level diagram with (a) a battery pack controller (BMS), and (b) a battery pack with N battery bricks in series.

FIG. 2 illustrates a battery pack consisting of N series output connected bricks with a BMS controller. Each battery brick consists of m parallel output connected BPMs, as shown in FIG. 2(b), where the total number of the BPMs in the battery pack is mN. Overall system control functions are distributed between the N bricks and the central controller, as shown in FIG. 2(a) and FIG. 2(b). SOC balancing between all BPMs is achieved by continuously tracking the average SOC of the battery pack $SOC_{avg}$, which is enabled by regulating the input current of all BPMs. However, the desired current references for the individual BPMs are unique, which are generated in the central controller, as shown in FIG. 2(a).

A. Battery Pack Controller Roles

The battery pack controller (BMS) is responsible for system-level control and cell balancing algorithms, as shown in FIG. 2(a). The BMS acquires all battery cell voltages, currents, and temperatures from the brick controllers through an isolated Controller Area Network ("CAN") communication bus (dashed lines) at a 1 Hz rate. in some embodiments, the BMS implements a sigma-point Kalman filter ("SPKF") for SOC estimation. By definition, the N series output connected battery bricks share the same output current. Therefore, balancing between the N battery bricks is feasible as the battery charges or discharges into the HVDC bus. Thus, loads or sources in the DC bus dictate charging or discharging modes that govern an average state-of-charge $SOC_{avg}$. Consequently, the BMS monitors the bus voltage $v_{bus}$ and utilizes a SOC compensator $G_{soc}$ to track the desired (target) average SOC $S\hat{O}C_{ref}$ that depends on the target application. The SOC compensator output is the common (average) input current reference (average current signal) $\tilde{i}_{all}$ in all BPMs to regulate the pack average $SOC_{avg}$:

$$\tilde{\imath} = G_{SOC}(S\hat{O}C_{avg} - S\hat{O}c_{ref}). \qquad (1)$$

B. Brick Controller Roles

Each of the N bricks, in some embodiments, utilizes a single controller board that enables control and modulation of the m paralleled BPMs, as shown in FIG. 2(b). Each brick controller hosts m independent input current loop compensators $G_{ci}$ to regulate the individual input port currents of the m BPMs. The N brick controllers receive two identical quantities from the BMS, (1) the common input current reference (average current signal) $\tilde{i}_{all}$, and (2) the averaged bus voltage $v_{avg} = v_{bus}/N$.

Practically, even for balanced SOCs, there are mismatches between the battery cell voltages. Therefore, with a common input current reference in all BPMs in equation (1) the power of each bricks is different, where output voltage mismatches between the N battery bricks introduce a system-level instability. Droop control is utilized, in some embodiments, to stabilize the overall system by sharing the output voltage between the bricks around $v_{avg}$. Consequently, the $j^{th}$ battery brick controller establishes a local input current reference $i_{ref,j}$, which is obtained by adding a local droop current $i_{dj}$ to $i_{all}$ for output voltage-sharing:

$$\tilde{i}_{ref,j} = \tilde{i}_{all} + \tilde{i}_{dj}, \quad (2)$$

$$\tilde{i}_{dj} = G_d(\tilde{v}_{avg} + \tilde{v}_{oj}), \quad (3)$$

where $G_d$ is a droop conductance and $\tilde{v}_{oj}$ is the $j^{th}$ brick output voltage. At equilibrium, the output current is identical for the N battery bricks. At steady-state, all bricks' output voltages are equal to $v_{avg}$, where the droop currents are nullified:

$$\sum_{j \in N} i_{dj}(t) = 0. \quad (4)$$

However, each BPM requires a unique differential input current reference $\Delta I_{ij}$ (e.g. balancing current) to control the individual SOC, which is the backbone for SOC balancing that is discussed below. Therefore, the input current reference of the $i^{th}$ BPM within the $j^{th}$ brick $\tilde{i}_{ij,ref}$ is:

$$\tilde{i}_{ref,ij} = \tilde{i}_{ref,j} + \Delta I_{ij}, \quad (5)$$

where $\tilde{i}_{ref,j}$ is the common input current reference in the $j^{th}$ brick, and $\Delta I_{ij}$ is a differential input current (e.g. balancing current) for SOC control. The input current compensator $G_{ci}$ of the $i^{th}$ BPM within the $j^{th}$ brick adjusts the control command $\tilde{u}_{ij}$ to track the desired battery cell current reference $\tilde{i}_{ref,ij}$ equation (5). The control command $\tilde{u}_{ij}$ in some embodiments is a duty cycle. The settling times for SOC balancing is significantly longer than the settling times of the current regulation loops.

III. Hierarchical SOC Balancing Mechanism

This section develops the mathematical foundation of the hierarchical SOC balancing strategy between the mN BPMs. Balancing between the mN BPMs, in some embodiments, is achieved in two steps: (1) within each brick, the m paralleled BPMs are balanced when the SOCs of the individual BPMs are equal to the average SOC of the brick, i.e., $SOC_{1j} = SOC_{2j} \ldots SOC_{mj}$, and (2) SOC balancing among the N battery bricks is achieved when the average SOC in each brick is equal to the average SOC in the entire battery pack $SOC_{avg}$, i.e., $SOC_1 = SOC_2 \ldots SOC_N = SOC_{avg}$. In other embodiments, balancing is achieved for all BPMs in a single step. The SOC of any BPM can be expressed in terms of the input current, and cell capacity Q that is assumed equal in all BPMs:

$$SOC_{ij}(t) = SOC_{ij,0} + \delta SOC_{ij}(t), \quad (6)$$

$$\delta SOC_{ij}(t) = -\frac{1}{Q} \int_0^t i_{ij}(t)dt, \quad (7)$$

where $SOC_{ij,0}$, $i_{ij}$, are the initial SOC and input current of the $i^{th}$ BPM in the $j^{th}$ brick, respectively. Within the $j^{th}$ brick, the average SOC of the brick $SOC_j$ is determined by the m paralleled BPMs as in equation (8). Similarly, $SOC_{avg}$ is formulated in terms of the initial SOCs of the N series connected battery bricks $SOC_{j,0}$ and the change in the SOC if the individual battery bricks $\delta SOC_j(t)$ as in equation (10).

$$SOC_j(t) = \underbrace{\frac{1}{m}\sum_{i \in m} SOC_{ij,0}}_{SOC_{j,0}} + \underbrace{\frac{1}{m}\sum_{i \in m} \frac{-1}{Q}\int_0^t i_{ij}(t)dt}_{\delta SOC_j(t)}. \quad (8)$$

-continued $$SOC_{avg}(t) = SOC_{avg,0} + \delta SOC_{avg}(t). \quad (9)$$

$$SOC_{avg}(t) = \underbrace{\frac{1}{N}\sum_{j \in N} SOC_{j,0}}_{SOC_{avg,0}} + \underbrace{\frac{-1}{N}\sum_{j \in N} \delta SOC_j(t)}_{\delta SOC_{avg}(t)} \quad (10)$$

Ideally, from equations (7) and 8), SOC balancing between the m paralleled BPMs is possible while keeping the average SOC in the brick $SOC_j$ constant, i.e., $\delta SOC_j(t)=0$, which can be achieved with circulating currents between the BPMs. However, from equations (8) and (10), the change in the SOCs of the N bricks is feasible as $SOC_{avg}$ varies through loads or sources at the HVDC bus. Assuming that all BPMs regulate their input currents with zero steady-state error by following the current reference in the brick, from equation (2), the change in the SOCs in a brick is evaluated:

$$\delta SOC_j(t) = \frac{1}{m}\sum_{i \in M} \frac{-1}{Q}\int_0^t i_{ref,ij}(t)dt \quad (11)$$

$$= \frac{-1}{Q}\int_0^t i_{ref,j}(t)dt$$

$$= \underbrace{\frac{-1}{Q}\int_0^t i_{all}(t)dt}_{\delta SOC_{avg}(t)} + \underbrace{\frac{-1}{Q}\int_0^t i_{dj}(t)dt}_{\delta SOC_{dt}(t)}$$

by substituting from equations (4) and (11) into equation (10), the change in the average SOC of the entire battery pack $\delta SOC_{avg}$ is evaluated:

$$\delta SOC_{avg}(t) = \frac{-1}{N}\sum_{j \in N} \delta SOC_j(t) = \frac{-1}{Q}\int_0^t i_{all}(t)dt. \quad (12)$$

From equation (12), it is clear that the change in $SOC_{avg}$ is directly dependent on $i_{all}$. Moreover, the change in the average SOC of each brick depends on $i_{all}$, and the droop current that is critical for voltage sharing in equation (3), as expressed in equation (11). However, equal voltage sharing between the N series connected bricks counters SOC balancing because all bricks inject or absorb equal powers. Therefore, the average input current references in the N bricks must be different for individual SOC control. As a result, the change in the average SOC of a brick $\delta SOC_j(t)$ is unique:

$$\delta SOC_j(t) = \delta SOC_{avg}(t) + \delta SOC_{dj}(t) - \frac{1}{Q}\int_0^t \delta i_j(t)dt, \quad (13)$$

where $\delta i_j$ is the input current offset in the $j^{th}$ brick to achieve SOC balancing between the N series output connected bricks.

Within the $j^{th}$ brick, the change in the SOCs of the m BPMs will be equal because $\delta i_j$ is introduced to the m paralleled BPMs. Therefore, the current offsets in the m BPMs must be different for individual SOC control. For example, the change in the SOC of the $i^{th}$ BPM within the $j^{th}$ brick $\delta SOC_{ij}$, is controlled by introducing a current offset $\delta i_{ij}$. As a result, the change in the average SOC of a BPM is unique:

$$\delta SOC_{ij}(t) = \delta SOC_j(t) - \frac{1}{Q}\int_0^t \delta i_{ij}(t)dt. \quad (14)$$

IV. Input Current Offset Restrictions

Figure 3:
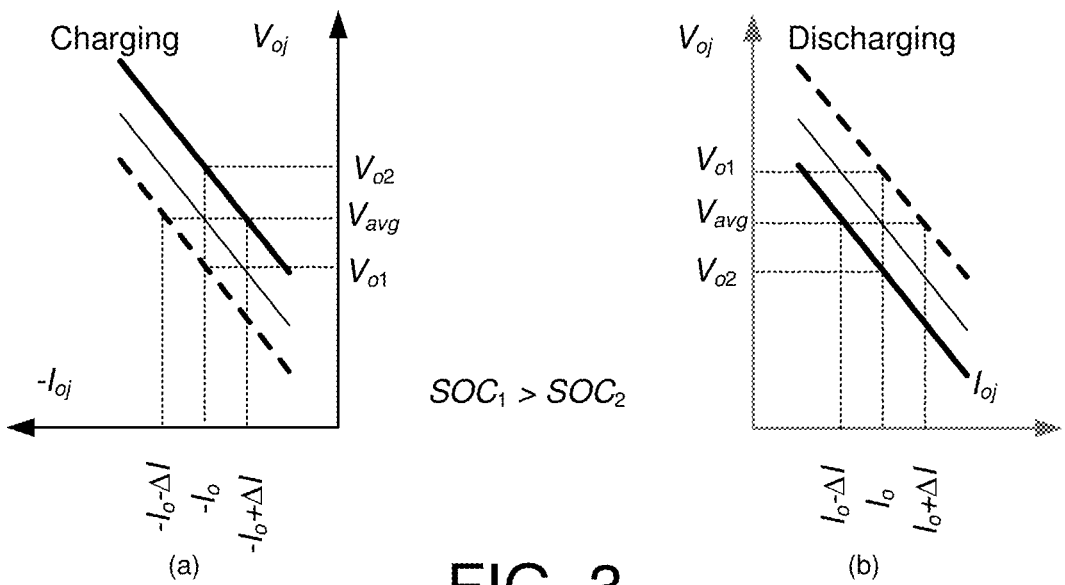
FIG. 3 is a diagram illustrating one embodiment of a desired droop characteristic for (a) charging behavior, and (b) discharging behavior.

The previous section has explained the roles of the common input current reference and balancing currents for SOC balancing. This section discusses restrictions in the input current offsets to achieve SOC balancing. The brick controller roles subsection II-B above has discussed the droop loops, which ensure that the N bricks share the DC bus voltage equally at $V_{avg}$. Consider the steady-state droop characteristics $V_o$ $I_o$ of a two-brick system during charging and discharging modes, as shown in FIG. 3(a) and FIG. 3(b), respectively. At a given output current $I_o$, the characteristics of the two bricks overlap in the middle lines, where the voltage across each brick is equal to $V_{avg}$.

Figure 4:
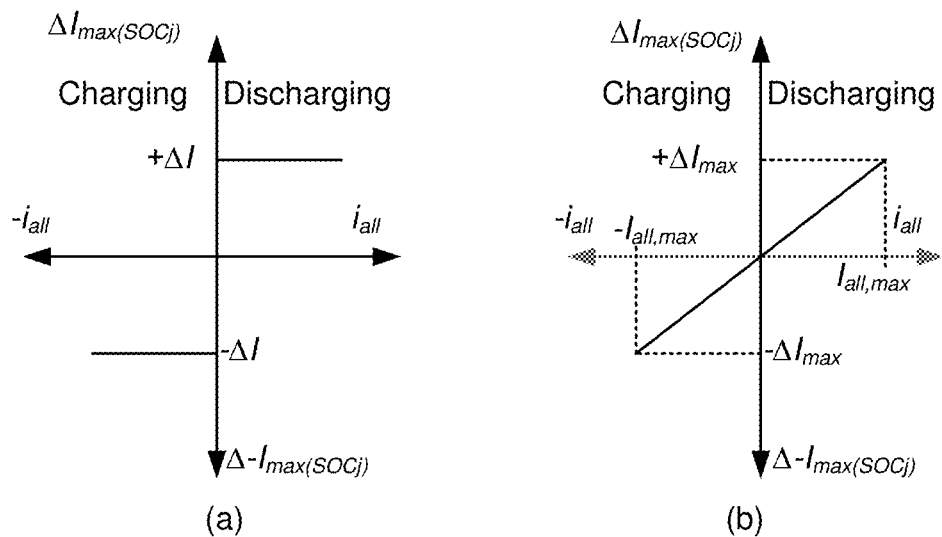
FIG. 4 is a diagram illustrating one embodiment of a desired balancing current relationship vs $i_{all}$ for (a) polarity dependent characteristics for the series output connected bricks, (b) a linear relationship with the common input current reference $i_{all}$ for the series output connected bricks, (c) fixed positive current offset characteristics for the parallel output connected BPMs, and (d) a linear relationship with the modulus of $i_{all}$ for the parallel output connected BPMs.

With the goal of balancing the average SOCs of the bricks, the balancing current offsets±$\Delta I$ must ensure that the highest SOC brick max ($SOC_j$) carries the lowest voltage during charging and the highest voltage during discharging, as shown in FIG. 3(a) and FIG. 3(b), respectively. Therefore, during charging, the current offset in the highest SOC brick $\Delta I_{max}$(socj) is negative, while the current offset in the lowest SOC brick is positive, as shown in FIG. 3(a). However, during discharging, the current offset in the highest SOC brick is positive, while the current offset in the lowest SOC brick is negative, as shown in FIG. 3(b). This behavior is achieved by incorporating the polarity of the common input current reference $i_{all}$ in the desired input current offset for the highest SOC brick, as shown in FIG. 4(a). Furthermore, the rate of change of a brick SOC is proportional to the average input current in the brick, as expressed in equation (13). Thus, to decrease the balancing time, the input current offsets scale linearly with $i_{all}$ instead of utilizing fixed balancing currents, as shown in FIG. 4(b).

On the other hand, the individual current offsets in the m paralleled BPMs within a brick change the individual output currents of the BPMs. In an ideal BPM, the input and output powers are equal:

$$V_{in}I_{in} = I_o V_o, \quad (15)$$

where $V_o$ is the output voltage at a given output current $I_o$, $I_{in}$ is the input current, and $V_{in}$ is the battery cell voltage across the BPM. If the output voltage is held constant and neglecting the change in the battery cell voltage, the input current offset changes the BPM's output current $\Delta I_o$:

$$\Delta I_{in} = \frac{V_o}{V_{in}}\Delta I_o \quad (16)$$

where the change in the output port current and the input current offset has the same polarity, i.e., sgn($\Delta I_o$)=sgn($\Delta I_{in}$). The balancing current offsets in the m paralleled BPMs within a brick ensure that the output current from the highest SOC BPM is the largest in the entire brick during discharging. However, during charging, the absolute value of the output current from the highest SOC BPM is the smallest in the entire brick. Thus, for balancing the m paralleled BPMs within a brick, the input current offset of the highest SOC BPM $\Delta I_{max(SOCi,j)}$ is always positive, as shown in FIG. 4(c). Finally, to decrease the balancing time, the input current offsets scale linearly with $|i_{all}|$ instead of utilizing fixed balancing currents, as shown in FIG. 4(d).

V. Balancing

The balancing algorithm calculates the individual current offsets to achieve SOC balancing between the mN BPMs. The balancing algorithm relies on the SOC estimations to achieve SOC balancing in three main steps.

For step one, the algorithm determines the differences in SOCs between the average SOC of the N bricks relative to $SOC_{avg}$ in equation (17):

$$\delta SOC_j = SOC_j - SOC_{avg} \forall j \in N. \quad (17)$$

Similarly, the algorithm calculates the difference between the SOCs of the m paralleled BPMs relative to their parent brick SOC in equation (18):

$$\delta SOC_{ij} = SOC_{ij} - SOC_j \forall j \in N, i \in m. \quad (18)$$

For step two, the balancing algorithm minimizes the balancing time by a penalizing the brick with the absolute maximum difference in SOC from $SOC_{avg}$, which is achieved by converting equation (17) to a per-unit quantity:

$$\Delta pu_j = \frac{SOC_j - SOC_{avg}}{max_{j \in N}\{|\delta SOC_j|\}} \forall j \in N. \quad (19)$$

Similarly, in each of the N bricks, the balancing algorithm utilizes the BPM with the absolute maximum difference in SOC from the brick's average SOC. i.e., $SOC_j$ to convert equation (18) to a per-unit quantity:

$$\Delta pu_{ij} = \frac{SOC_{ij} - SOC_j}{max_{i \in m}\{|\delta SOC_{ij}|\}} \forall j \in N, i \in m. \quad (20)$$

For step three, considering the desired input current offsets' polarities that are discussed in input current offset restrictions, the balancing algorithm converts $\Delta pu_j$ and $\Delta pu_{ij}$ into balancing currents for the individual cells $\Delta I_{ij}$:

$$\Delta I_{ij} = \alpha \cdot i_{all} \cdot \Delta pu_j + \alpha \cdot |i_{all}| \cdot \Delta pu_{ij} \quad (21)$$

$$= \alpha \cdot i_{all} \frac{\delta SOC_j}{SOC_{brick,max}} + \alpha \cdot |i_{all}| \frac{\delta SOC_{ij}}{SOC_{MaxCell,j}} \forall j \in N, i \in m,$$

where $\alpha < 1$ is a scalar that is limited by the ratings of the converters; Thus, the balancing currents are limited to A$I_{max}$ as the common current reference approaches '$I_{max}$.

VI. Experimental Results

Figure 5:
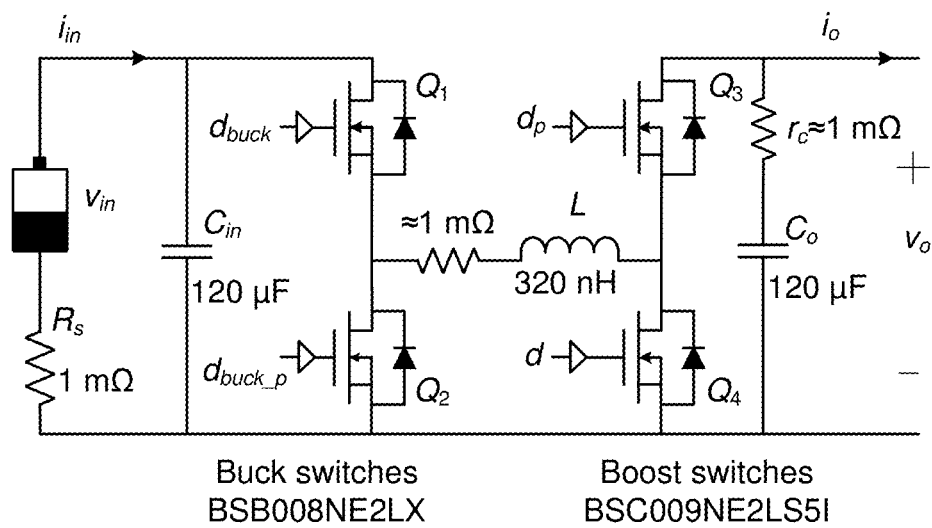
FIG. 5 is a schematic block diagram of an experimental prototype with (a) four-switch buck-boost converter forming a BPM, (b) three parallel output BPMs forming a brick.
Figure 5:
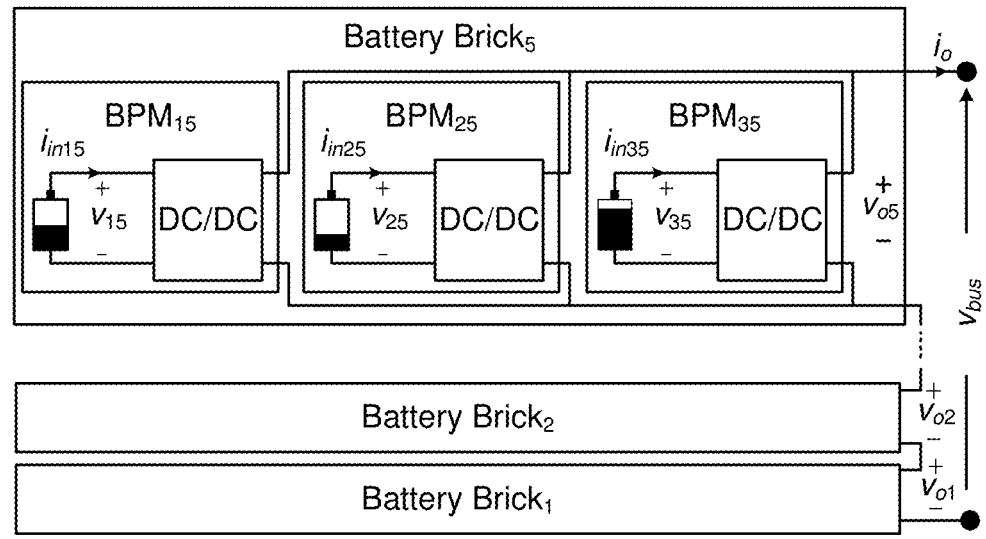

A 1.5 kilowatt-hours ("kWh") 1 C-rate battery pack prototype consisting of 15 parallel and series output connected BPMs has been developed. A single BPM employs a 100 watts ("W") four-switch buck-boost DC/DC converter, as shown in FIG. 5(a). The individual BPMs are connected across 25 amp-hours ("Ah") battery cells. Moreover, each group of three BPMs forms a battery brick by paralleling the converter outputs. Therefore, the overall battery pack consists of five series output connected battery bricks, as illustrated in FIG. 5(b). Table I summarizes the prototype parameters.

TABLE 1

| Experimental Prototype Parameters | |
|---|---|
| Parameter | Value |
| Battery pack prototype capacity | 1.5 kWh |
| Power rating of the prototype | 1.5 kW |
| Number of BPMs mN | 15 |
| Number of battery bricks | 5 |
| Number of BPMs in a brick m | 3 |
| Battery cell capacity | 25 ± 5% Ah |
| Maximum common current $I_{all,max}$ | ±25 A |
| Maximum balancing current $\Delta I_{max}$ | 6 A |
| Minimum droop gain $G_{d,min}$ | 2 A/V |
| Maximum droop gain $G_{d,max}$ | 14 A/V |

Each battery brick utilizes a Piccolo TMS320F280049 microcontroller for modulation and control of the individual DC/DC converters. The switching frequency of the individual BPMs is 200 kilohertz ("kHz"). During the battery pack startup, all BPMs regulate the cell currents and operate in buck mode to allow a soft-starting mechanism. However, the BPMs operate in boost mode during normal operation. Therefore, the brick controller implements three identical current PI compensators $G_{ci}$ for individual cell current regulation. Each of the three compensators takes the form:

$$G_{ci} = K_p + \frac{K_i}{s}. \tag{22}$$

The input current loop compensator G is designed to achieve a phase margin of 84 degrees and a crossover frequency of 1 kHz, when the three BPMs supply a 300 W resistive load and operate with differential balancing currents at M(D)=2.5. The PI current compensator gains are:

$$K_i = 2, K_p = \frac{.001}{\pi}. \tag{23}$$

A battery pack prototype and a BMS board were created that utilizes a Piccolo® TMS320F280049 microcontroller for system-level control and SOC estimation. The microcontrollers in the BMS and brick controllers establish an isolated CAN communication bus. The BMS communicates with the bricks and acquires the sampled currents, voltages, and temperatures from all BPMs to run the SOC estimation algorithm at 1 Hz rate. Charging and discharging the battery pack is determined by sources and loads at the output terminal, where the BMS determines the target SOC, i.e., $SOC_{ref}$ according to the bus voltage:

$$SOC_{ref}[\%] = \begin{cases} 0, & v_{bus} \leq 24, \\ 50(v_{bus} - 24), & 24 < v_{bus} \leq 26, \\ 50(v_{bus} - 26), & 26 < v_{bus} \leq 28, \\ 100, & 28 < v_{bus} \leq 32. \end{cases} \tag{24}$$

Moreover, the BMS computes the average SOC of the battery pack $SOC_{avg}$, and hosts the average SOC compensator $G_{csoc}$ to track $SOC_{ref}$ in equation (24). The average SOC compensator $G_{csoc}$ takes the form:

$$G_{csoc} = \frac{\left(K_{Psoc} + \frac{K_{Isoc}}{s}\right)}{\left(1 + \frac{s}{2\pi f_{p1}}\right)\left(1 + \frac{s}{2\pi f_{p2}}\right)}, \tag{25}$$

resulting in in a phase margin of 100 degrees and a crossover frequency of 45 Hz, when the three BPMs supply a 300 W resistive load and operate at M(D)=2.5. The gains of the compensator are:

$$K_{Isoc} = 200, K_{Psoc} = \frac{10}{\pi}, f_{p1} = 1000, f_{p2} = 2000. \tag{26}$$

The SOC compensator output is the common input current reference $i_{all}$, which is transmitted to the 15 BPMs over the isolated CAN bus at 2 kHz along with the averaged bus voltage $v_{avg}$. Finally, the BMS runs the balancing algorithm and transmits the computed current offsets at 1 Hz rate.

An experimental setup was created where a bidirectional supply is connected across the battery pack. The bidirectional supply operates in positive and negative constant current mode with a voltage limit to emulate sources and loads to allow charging and discharging of the battery pack. In this section, a positive battery pack output current is associated with discharging, and a negative battery pack output current is associated with charging.

A. Balancing Between the Series Output Connected Bricks

Figure 6:
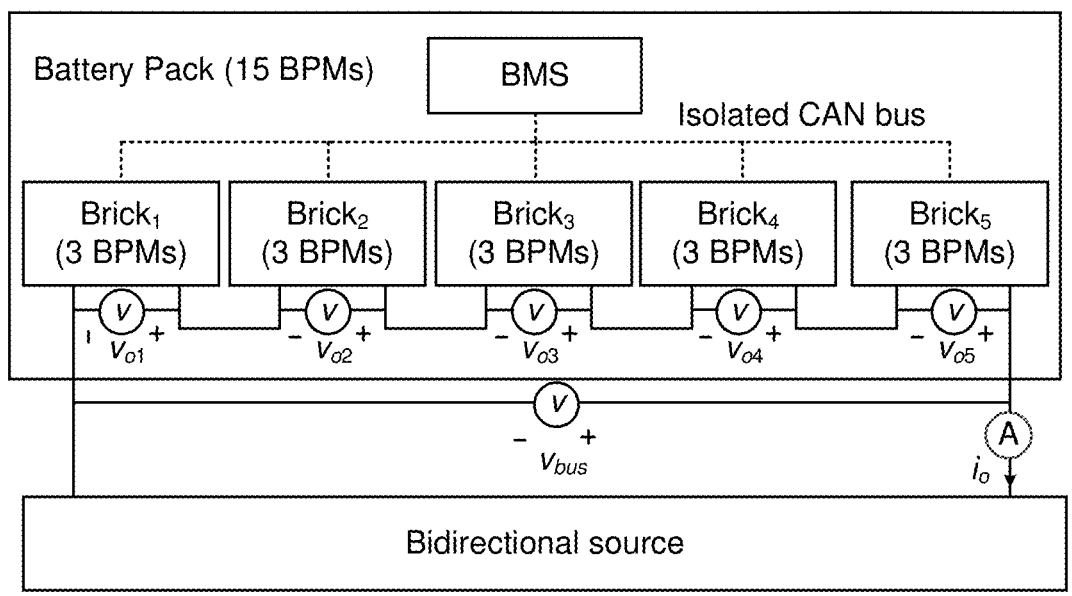
FIG. 6 is a schematic block diagram of an experimental setup and the probed signals depicted in FIG. 7.
Figure 7:
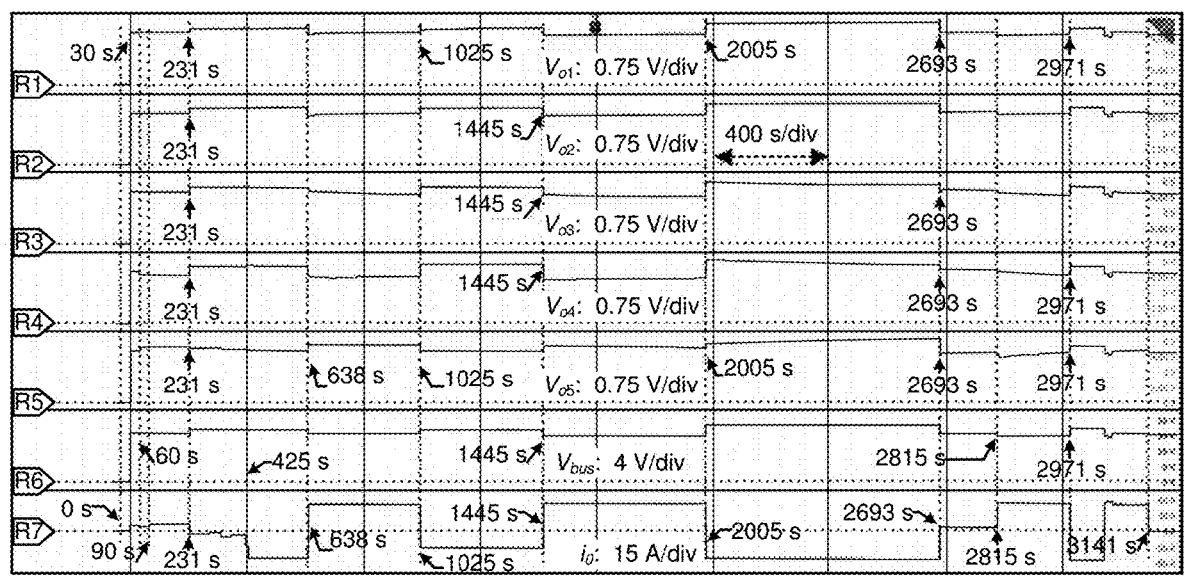
FIG. 7 is a diagram of experimental results for the probed signals R(1) to R(5), which is output voltage across the five series output connected bricks $v_{o1}$ to $v_{o5}$, probed signal R(6), which is the DC bus voltage $v_{bus}$, and the probed signal R(7), which is the battery pack output current $i_o$.
Figure 8:
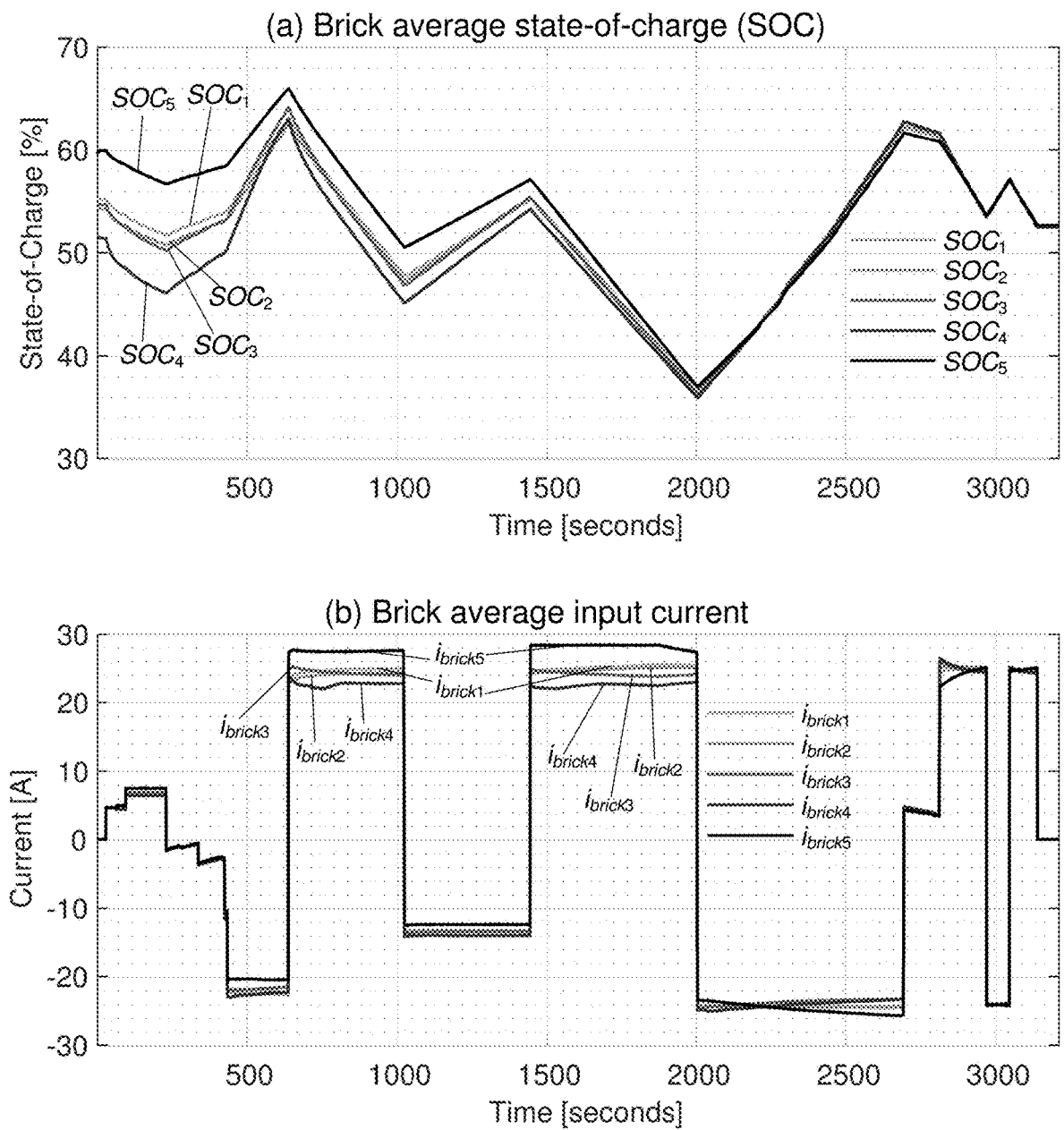
FIG. 8 is a diagram with experimental results of the bricks with (a) estimated SOCs, and (b) average input currents.

FIG. 6 depicts the probed voltages and currents in the experiment. The scope captures are depicted in a single figure by using TekScope™ software. FIG. 7 shows the scope traces for the output voltages across the five series output connected bricks, the DC bus voltage $v_{bus}$, and the output current $i_o$. Moreover, FIG. 8 summarizes the individual brick results as acquired through the CAN bus at 1 sec rate. Initially, the individual brick SOCs are 55.1%, 54.2%, 54.6%, 51.6%, and 59.6%, as shown in FIG. 8(a). At the beginning of the test, brick #5 has the highest SOC, and brick #4 has the lowest SOC, where the difference in SOC between the two bricks is 8%.

At 30 s, the battery pack output is enabled by discharging into a 10 amperes ("A") constant current load, where the DC bus voltage is 25 volts ("V") that is distributed equally across the five series output connected bricks, as shown in FIG. 7. At 60 s, the SOC balancing algorithm introduces individual brick average input current offsets to achieve SOC balancing between all BPMs. Therefore, the average input current in each brick is different, as shown in FIG. 8(b). as shown in FIG. 8(b). Thus, the output voltages across the five bricks are different and inject different powers while maintaining the same DC bus voltage, as shown in FIG. 7. Therefore, the rates of change in the SOCs between the bricks are different, as shown in FIG. 8(a). The SOC in the 5th brick $SOC_5$ is the highest in the entire battery pack, as shown in FIG. 8(a); thus, the output voltage $v_{o5}$ is the highest among the five bricks to inject the greatest power into the DC bus, on the other hand, the output voltage $v_{o4}$ is the lowest among the five bricks to inject the lowest power into the DC bus, as shown in FIG. 7. At 90 s, the bidirectional supply is set to 15 A load, where the average input current reference in all bricks and the input current offsets increase, as shown in FIG. 8(b).

However, at 231 seconds ("s"), the bidirectional supply is set to 5 A with 30 V as a voltage limit in source mode. At 423 s, the bidirectional current in increased to 50 A in source mode. As a result, all BPMs charge from the DC bus, which is held at approximately 27.25 V between 231 s and 423 s interval. Moreover, the input current references and the current offsets are negative to charge the battery cells, as shown in FIG. 8(b). In contrast to the discharging case, the output voltage $v_{o5}$ is the lowest among the five bricks to absorb the lowest power from the DC bus, whereas the output voltage $v_{o4}$ is the highest among the five bricks to absorb the highest power from the DC bus, as shown in FIG. 7. At 638 s, the absolute maximum difference in SOC between the lowest and highest SOC bricks is 5.4%.

Between 638 s and 1025 s and 1445 s and 2005 s, the bidirectional source is set to 55 A load, where the battery pack discharges into the DC bus; however, between 1025 s and 1445 s the bidirectional source is set to 30 A in source mode with a 30 V as a maximum voltage limit, as shown in FIG. 7. The balancing current offsets between 638 s and 1025 s and 1445 s and 2005 s are larger than the current offsets between 1025 s and 1445 s because the average input current in the bricks is higher in the discharging intervals, as shown in FIG. 8(b). Moreover, the output voltage $v_{o5}$ is the highest among the five bricks to during the discharging intervals, whereas the output voltage $v_{o4}$ is the highest among the five bricks to during the charging intervals, as shown in FIG. 7. Consequently, at 2005 s, the absolute maximum difference in SOC between the lowest and highest SOC bricks is approximately 0.4%.

Between 2005 s and 2693 s, the bidirectional source is set to 50 A in source mode with a 30 V as a maximum voltage limit, which charges the battery pack. Despite the mismatches between the cells capacities, the SPKF algorithm continuously updates the individual cell SOCs; at approximately 2100 s the estimated SOCs in the bricks are updated, where the input current offsets slightly change the average input currents in the bricks, as shown in FIG. 8(b). However, the absolute maximum difference in SOC between the lowest and highest SOC bricks remains within 0.4%. However, the bidirectional source settings are continuously changed to allow charging and discharging the battery pack; thus, SOC balancing among the individual BPMs is achieved. For example, between 2693 s to 2970 s and 3045 s to 3156 s, the bidirectional source is set to 55 A load with 24 V as a minimum DC bus voltage. At 3141 s, regulation is disabled, where the battery pack output current is zero, and the DC bus is held constant at 24 V by the bidirectional source, where the average SOCs in the bricks are balanced within 0.2%. In conclusion, the analysis presented in the previous sections is validated by balancing the series-output connected bricks experimentally.

The particular implementation of the battery pack described above and depicted in FIGS. 5(a) and 5(b) are a single implementation intended to show that the embodiments described herein are feasible. One of skill in the art will recognize that other implementations and designs will use other DC-to-DC converter types, different numbers of BPMs in a brick, different numbers of bricks in series, etc. One of skill in the art will recognize that the DC-to-DC converter of a BPM could be of various topologies, such as a buck-type topology, a boost-type topology, a resonant DC-to-DC converter, or any other converter that is able to convert the voltage of a battery cell into a voltage of a brick. The number of BPMs of a brick varies based on power level of each battery cell, power requirements of the battery pack, and the like. The number of bricks in series, in some embodiments, is selected based on a desired output voltage. One of skill in the art will be able to select various parameters and topologies for battery packs based on available battery cells, a desired bus voltage and power requirements of a load.

VII. Cell-Level SOC Balancing

Figure 9:
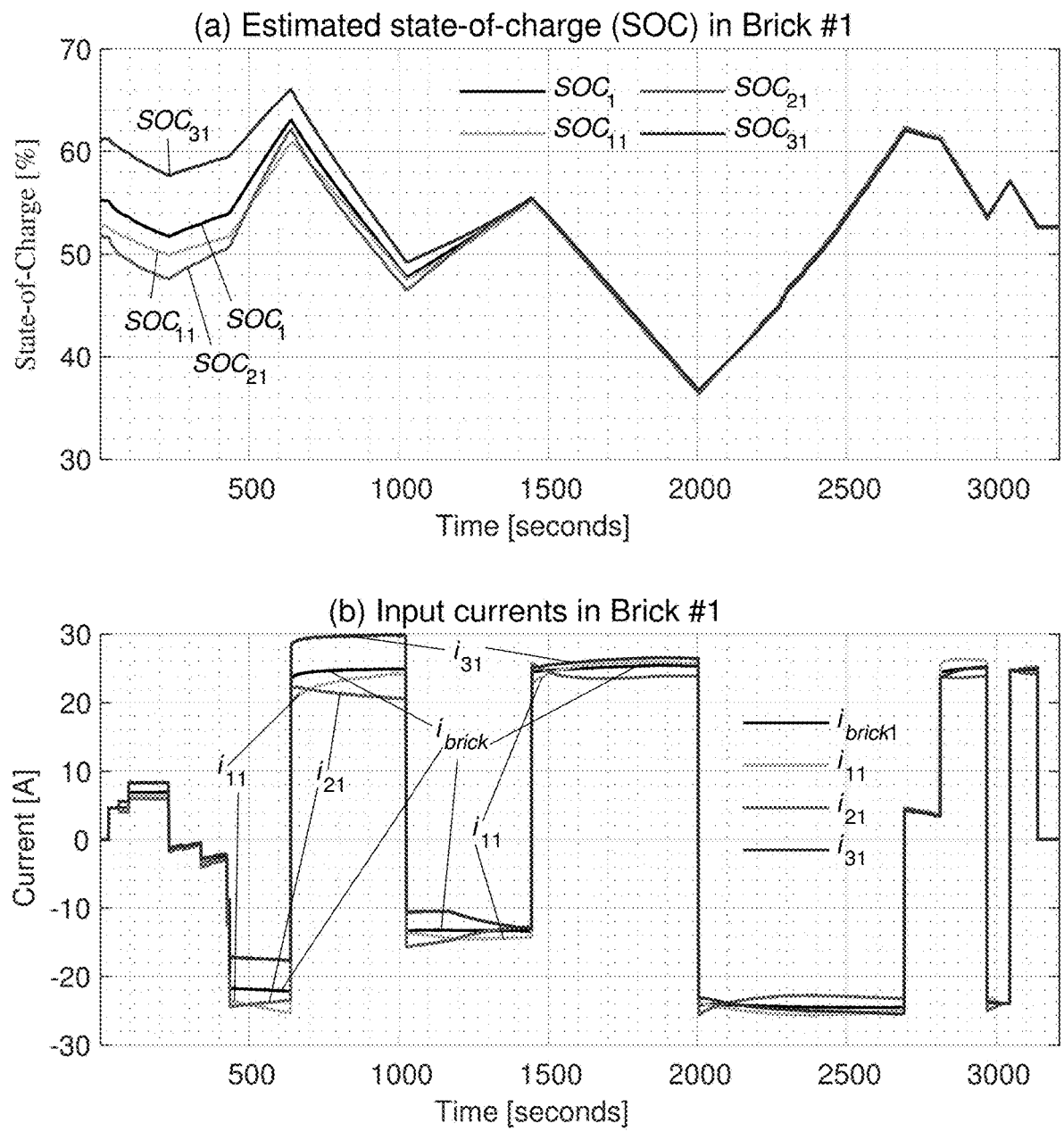
FIG. 9 is a diagram with experimental results of brick 1 with (a) estimated SOCs, and (b) individual BPM currents.

FIG. 9 shows experimental results for the three BPMs within brick #1 as acquired through the CAN bus at 1 second rate. The initial SOCs for cells #11, #21, and #31 are 52.8%, 51.8%, and 60.8%, respectively. Thus, the absolute difference in SOCs within the brick is 9.1%, and the average SOC in brick #1, i.e., $SOC_1$ is approximately 55.1%, as shown in FIG. 9(a). The average SOC in the brick $SOC_1$ is lower than the average SOC in cell #31, $SOC_{31}$; however, the average SOC in the brick $SOC_1$ is higher than the estimated SOC in cell #11, $SOC_{11}$, and cell #21 $SOC_{21}$, respectively. Therefore, the balancing algorithm introduces the current offsets to the individual cells such that the input current in cell #31, $i_{31}$ is higher than the average current in the brick $i_1$ during discharging, as shown in FIG. 9(b). However, the balancing algorithm ensures that the absolute value of the current $i_{31}$ is higher than the absolute value of the average current in the brick $i_1$ during charging, as shown in FIG. 9(b).

Similarly, the input current in cell #11 $i_{11}$, and the input current in cell #21 $i_{21}$ are lower than $i_1$ during discharging to inject lower power into the output terminal of the brick. However, $i_{11}$ and $i_{21}$ are higher than $i_1$ during charging to absorb more power from the output terminals of the brick. The balancing algorithm introduces the current offsets to the cells until balancing is achieved; thus, at 2005 s the absolute difference in SOCs within the brick is 0.3%. Moreover, the SPKF algorithm continues to update the SOC estimates for all BPMs in the system. Therefore, at 3015 s the absolute difference in SOCs within the brick is 0%, where the input currents in all BPMs within Brick #1 are equal, as shown in FIG. 9(b).

Figure 10:
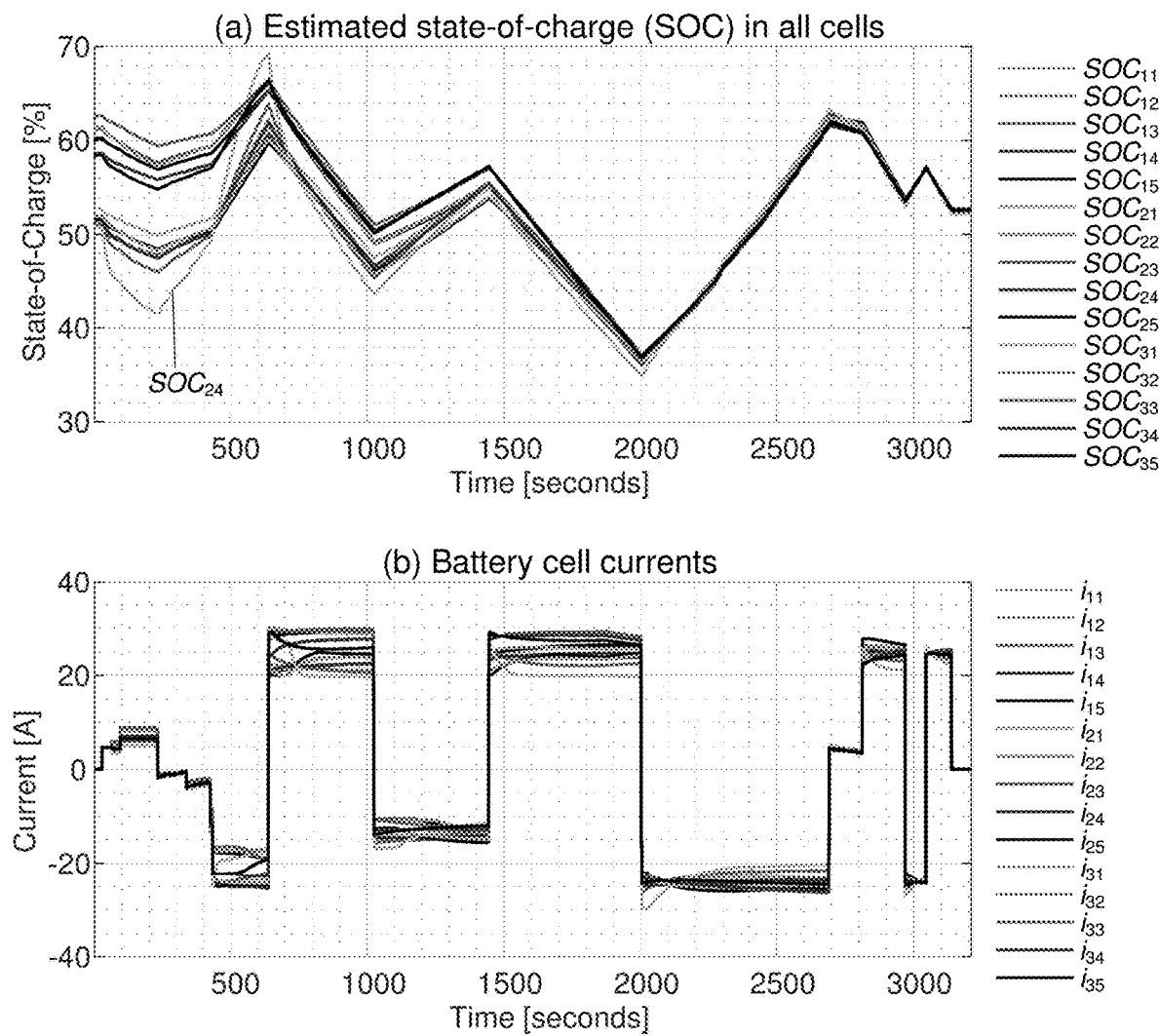
FIG. 10 is a diagram with experimental results of the battery pack with 15 BPMs/battery cells with (a) estimated SOCs, and (b) input currents.

FIG. 10 summarizes the experimental results for the 15 BPMs and all battery cells, which are acquired through the CAN bus at 1 sec rate. At the beginning of the test, the absolute maximum difference in SOC between all battery cells is approximately 10%, as shown in FIG. 10(a). Regulation is enabled at t=2 minutes, where all battery cells tracked the common current reference $i_{all}$, as shown in FIG. 10(b).However, balancing is enabled at t=3 minutes, where individual current offsets are transmitted to all BPMs, as shown in FIG. 10(b). Therefore, the absolute maximum difference in SOCs between all battery cells is controlled. After t=12 minutes in the test, the absolute maximum difference in SOCs between all battery cells is approximately 8.3%, as shown in FIG. 10(a). The common current reference is significantly low between t=14 and 24 minutes, as shown in FIG. 10(b). As a result, the absolute maximum difference in SOCs between all battery cells remains approximately 7.3% after t=24 minutes. However, between t=24 and 38 minutes, the current in all cells is relatively higher. As a result, at t=38 minutes the absolute maximum difference in SOCs between all battery cells is approximately 2%, as shown in FIG. 10(a). The SPKF algorithm continuously updates the individual cell SOCs for the balancing algorithm. Thus, the balancing algorithm updates the individual cell current offsets to achieve SOC balancing between all cells. At the end of the test, the absolute maximum difference in SOCs between all battery cells is approximately 0.9%, as shown in FIG. 10(a).

VII. SOC Balancing with Parallel and Series Output Connected Battery Modules

Figure 11:
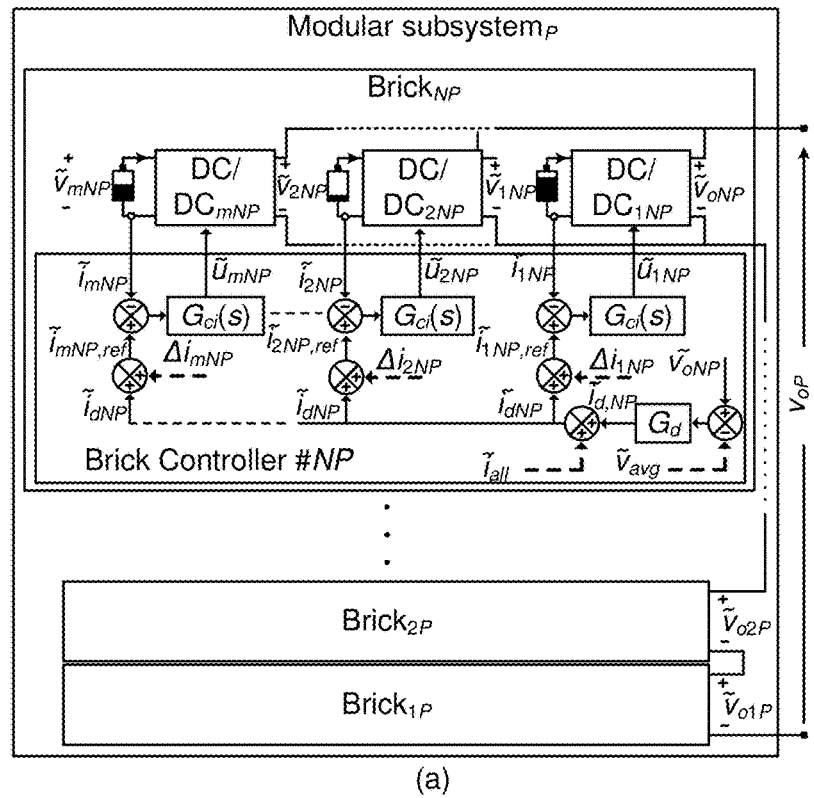
FIG. 11 is a schematic block diagram illustrating one embodiment of a battery pack with (a) a modular subsystem P, (b) a high voltage battery pack with modular subsystems in series, and (c) a high capacity battery pack with modular subsystems in parallel.
Figure 11:
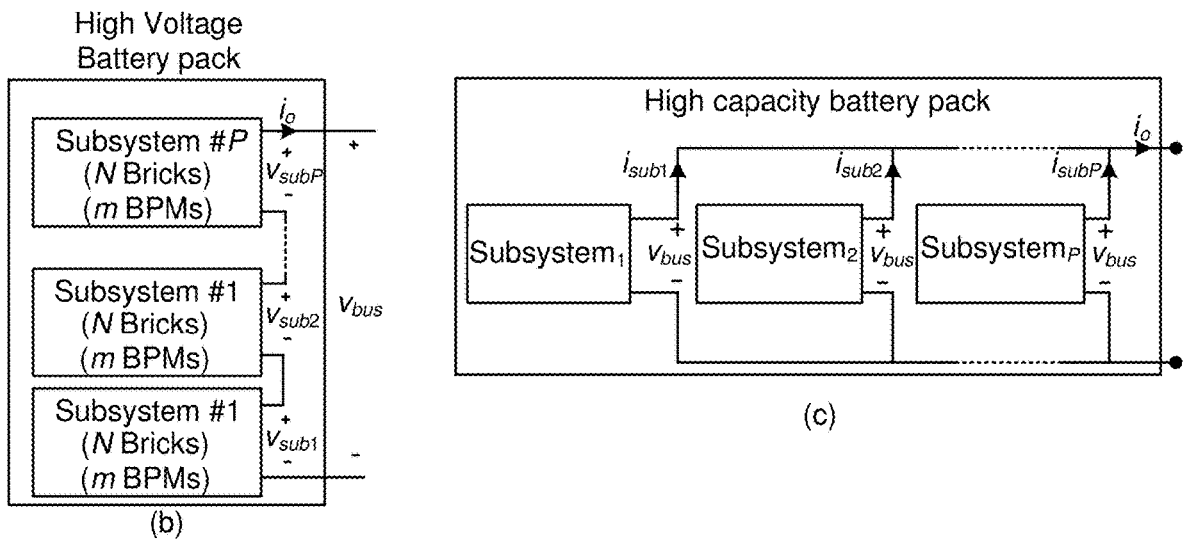

The balancing strategy can be applied on higher voltage and capacity battery systems. For instance, FIG. 11(a) depicts a modular battery subsystem with m parallel and N series output connected battery power modules. The total number of BPMs and cells in a modular subsystem is mN. A fully modular battery pack can consist of groups of modular subsystems. Assuming that the number of modular subsystems is P, the number of BPMs and battery cells in the battery pack is mNP. The subsystems can be connected in series to increase the overall output voltage of the battery pack, as shown in FIG. 11(b). Moreover, subsystems can be connected in parallel to increase the overall capacity of the battery pack, as shown in FIG. 11(c). The balancing concept in the original document is still applicable. However, minor modifications are needed according to the system configuration.

Thus, the current reference for the $i^{th}$ BPM within the $j^{th}$ brick and the $k^{th}$ subsystem is:

$$i_{ref,ijk} = i_{all} + i_{djk} + \Delta I_{ijk} \quad (27)$$

where $i_{djk}$ is droop current in the $j^{th}$ brick and the $k^{th}$ subsystem and $\Delta I_{ijk}$ is current offset for the $i^{th}$ BPM in the $j^{th}$ brick and the $k^{th}$ subsystem.

A. Modification of the Droop Current

The BMS now averages the entire bus voltage based on the number of bricks connected in series. If the subsystems are connected in series as shown in FIG. 11(b), the average is $V_{avg} = V_{bus}/(NP)$. On the other hand, if the subsystems are connected in parallel, as shown in FIG. 11(c), the average is $V_{avg} = V_{bus}/(N)$. Thus, the droop current reference for the $j^{th}$ brick and the $k^{th}$ subsystem is:

$$i_{djk} = \begin{cases} G_d\left(\frac{V_{bus}}{NP} - v_{ojk}\right), & \text{Series connected subsystems} \\ G_d\left(\frac{V_{bus}}{N} - v_{ojk}\right), & \text{parallel connected subsystems} \end{cases} \quad (28)$$

B. Modification of the Cell Balancing Current Offsets

The BMS finds the average SOC in the overall battery pack, in the P subsystems, and the N bricks in each subsystem. The balancing algorithm can be modified to accommodate for balancing as follows:

$$SOC_{avg} = \frac{1}{mNP} \sum_{k=1}^{P} \sum_{j=1}^{N} \sum_{i=1}^{m} SOC_{ijk} \quad (29)$$

where the average SOC in the subsystem is the average of all cells:

$$SOC_{avg} = \frac{1}{P} \sum_{k=1}^{P} SOC_k \quad (30)$$

where the average SOC in the subsystem is the average in all subsystems:

$$SOC_P = \frac{1}{N} \sum_{j=1}^{N} SOC_{jP} \quad (31)$$

where the average SOC in the subsystem is evaluated for the N bricks in this subsystem:

$$SOC_{NP} = \frac{1}{m} \sum_{i=1}^{m} SOC_{iNP} \quad (32)$$

where the average SOC in Brick #N in subsystem #p is evaluated for the BPMs within this brick. Steps for cell balancing, in some embodiments, are as follows:

Step 1

The algorithm determines the differences in SOCs between the average SOC of the P subsystems relative to the average SOC in the entire battery pack $SOC_{avg}$, where:

$$\delta SOC_k = SOC_k - SOC_{avg} \forall k \in P \quad (33)$$

(how far is the specific brick from the average in the specific subsystem). Similarly, the algorithm determines the differences in SOCs between the average SOCs in the relative to the average SOC in the subsystem, where they belong:

$$\delta SOC_{jk} = SOC_{jk} - SOC_k \forall j \in N, k \in P \quad (34)$$

(how far is this specific brick from the average in the specific subsystem). Similarly, the algorithm determines the differences in SOCs between the SOCs in the individual BPMs to the average SOC in the brick, where they belong:

$$\delta SOC_{ijk} = SOC_{ijk} - SOC_j \forall i \in m, j \in N, k \in P \quad (35)$$

(how far is this specific BPM from the average in the specific brick).

Step 2

The balancing algorithm minimizes the balancing time by penalizing the subsystem with the absolute maximum difference in SOC from SOC average:

$$\Delta pu_k = \frac{SOC_k - SOC_{avg}}{\max_{k \in P}\{|SOC_k - SOC_{avg}|\}} \forall k \in P \quad (36)$$

The balancing algorithm minimizes the balancing time by penalizing the brick with the absolute maximum difference in SOC from the average SOC in the subsystem where it belongs:

$$\Delta pu_{jk} = \frac{SOC_{jk} - SOC_k}{\max_{j \in N}\{|SOC_{jk} - SOC_k|\}} \forall j \in N, k \in P \quad (37)$$

The balancing algorithm minimizes the balancing time by penalizing the BPM with the absolute maximum difference in SOC from the average SOC in the brick where it belongs:

$$\Delta pu_{ijk} = \frac{SOC_{ijk} - SOC_{jk}}{\max_{i \in m}\{|SOC_{ijk} - SOC_{jk}|\}} \forall i \in m, j \in N, k \in P \quad (38)$$

Step 3

Considering the desired input current offsets' polarities that are discussed in Section IV, the balancing algorithm converts $\Delta puk$, $\Delta pujk$, and $\Delta puijk$ into balancing currents for the individual cells $\Delta Iijk$. However, the configuration of the subsystems is critical in this step:

$$\Delta I_{ijk} = \begin{cases} \alpha i_{all}\Delta pu_k + \alpha i_{all}\Delta pu_{jk} + \alpha |i_{all}|\Delta pu_{ijk}, \text{ Series connected subsystems} \\ \alpha |i_{all}|\Delta pu_k + \alpha i_{all}\Delta pu_{jk} + \alpha |i_{all}|\Delta pu_{ijk}, \text{ Parallel connected subsystems} \end{cases} \quad (39)$$

$$\forall i \in m, j \in N, k \in P$$

$$\Delta I_{ijk} = \begin{cases} \alpha i_{all}\dfrac{SOC_k - SOC_{avg}}{\max_{k \in P}\{|SOC_k - SOC_{avg}|\}} + \alpha i_{all}\dfrac{SOC_{jk} - SOC_k}{\max_{j \in N}\{|SOC_{jk} - SOC_k|\}} + \\ \quad \alpha |i_{all}|\dfrac{SOC_{ijk} - SOC_{jk}}{\max_{i \in m}\{|SOC_{ijk} - SOC_{jk}|\}}, \text{ Series} \\ \alpha |i_{all}|\dfrac{SOC_k - SOC_{avg}}{\max_{k \in P}\{|SOC_k - SOC_{avg}|\}} + \alpha i_{all}\dfrac{SOC_{jk} - SOC_k}{\max_{j \in N}\{|SOC_{jk} - SOC_k|\}} + \\ \quad \alpha |i_{all}|\dfrac{SOC_{ijk} - SOC_{jk}}{\max_{i \in m}\{|SOC_{ijk} - SOC_{jk}|\}}, \text{ Parallel} \end{cases} \quad (40)$$

This application focuses on state-of-charge balancing with parallel and series output connected battery power modules (BPMs) in active battery management systems. In contrast to the existing SOC balancing schemes that rely on output voltage regulation, this application employs current regulation instead to enhance modularity and paralleling capabilities in large battery packs. In addition, the proposed method relies on the cell current sensors for balancing, eliminating the need for additional output current sensing circuitry. The BMS regulates all cell currents to a common current reference for average SOC regulation. The BMS balances the individual battery cells by introducing unique current offsets to all BPMs for SOC balancing. The balancing current offsets depend on the common current reference, and the BPMs ratings. The approach is validated experimentally using a 1.5 kWh 1 C-rate active BMS consisting of 15 parallel and series output connected BPMs for a 24 V system. Experimental results prove successful SOC balancing between the 15 battery cells.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a battery pack comprising a plurality of N battery bricks ("bricks"), wherein N is an integer greater than or equal to 1, an output of each of the N bricks of the battery pack comprising a direct current ("DC") output voltage, wherein output terminals of each of the N bricks are connected in series and provide a bus voltage, wherein each of the N bricks comprises a plurality of m battery power modules ("BPMs"), wherein m is an integer greater than or equal to 1, each of the m BPMs comprising a DC output voltage, wherein output terminals of each of the m BPMs is connected in parallel and together provide the output voltage of each of the N bricks and each of the m BPMs of a $j^{th}$ brick of the N bricks has an input connected to a battery cell, wherein j is an integer between 1 and N, wherein each of an $i^{th}$ BPM of the m BPMs is controllable to charge and discharge the battery cell connected to the $i^{th}$ BPM;
a battery brick controller for each of the N bricks, the battery brick controller for each of a $j^{th}$ brick of the N bricks is configured to provide a control signal to each of the m BPMs of the $j^{th}$ brick, wherein a control signal of an $i^{th}$ BPM of the m BPMs of the $j^{th}$ brick is derived from a BPM error signal comprising a battery cell current of the battery cell connected to the $i^{th}$ BPM subtracted from a summation of an average current signal, a local droop current and a balancing current, the balancing current based on a current state-of-charge ("SOC") of the battery cell connected to the $i^{th}$ BPM and a desired SOC for the battery cell connected to the $i^{th}$ BPM; and
a battery management system ("BMS") configured to derive the balancing current for each of the m BPMs of the N bricks of the battery pack.

2. The apparatus of claim 1, wherein, for each BPM of the m BPMs of the N bricks, the BMS derives the balancing current for an $i^{th}$ BPM of the m BPMs of the N bricks of the battery pack from current and voltage measurements from the battery cell connected to the $i^{th}$ BPM, the bus voltage, and a target SOC of the battery pack.

3. The apparatus of claim 1, wherein the local droop current comprises a product of a droop conductance and an error signal derived from an average voltage subtracted from the output voltage of the $j^{th}$ brick of the N bricks controlled by the battery brick controller, wherein the average voltage comprises the bus voltage divided by the number of bricks N.

4. The apparatus of claim 1, wherein the average current signal comprises a product of a SOC compensator and a difference between an average SOC and a SOC reference signal, the average SOC comprising a total of the SOC for each battery cell connected to a BPM of the m BPMs of the N bricks of the battery pack divided by the number of BPMs mN of the battery pack and the SOC reference signal is derived from a target SOC of the battery pack.

5. The apparatus of claim 4, wherein the SOC reference signal scales linearly with the bus voltage over a first voltage range for charging of the battery cells of the battery pack and scales linearly with the bus voltage over a second voltage range for discharging of the battery cells of the battery pack, wherein the first voltage range is below the second voltage range and the first voltage range and the second voltage range are within an overall voltage regulation range of the bus voltage.

6. The apparatus of claim 1, wherein the balancing current for an $i^{th}$ BPM of a $j^{th}$ brick is derived from scalar configured to limit output current of the BPMs, the average current signal, a SOC of the battery cells connected to the m BPMs of the $j^{th}$ brick, and a SOC of the battery cell connected to the $i^{th}$ BPM.

7. The apparatus of claim 6, wherein the average current signal is positive for discharging the battery cells of the battery pack and negative for charging the battery cells of the battery pack and the balancing current for the $i^{th}$ BPM of the m BPMs connected in parallel of a $j^{th}$ brick of the N bricks is positive when the average current signal is positive and negative.

8. The apparatus of claim 7, wherein the balancing current scales linearly with the average current signal.

9. The apparatus of claim 6, wherein the balancing current of a $DPM_{ij}$ $\Delta I_{ij}$ is::

$$\Delta I_{ij} = \alpha \cdot i_{all} \frac{\delta SOC_j}{SOC_{brick,max}} + \alpha \cdot |i_{all}| \frac{\delta SOC_{ij}}{SOC_{MaxCell,j}} \forall\ j \in N,\ \in m$$

where:
  $\alpha$ is the scalar;
  $i_{all}$ is the average current signal;
  $\delta SOC_j = SOC_j - SOC_{avg} \forall j \in N$;
  $SOC_j$ is the SOC for brick j of the N bricks of the battery pack;
  $SOC_{avg}$ is an average SOC of all battery cells of the battery pack;
  $SOC_{brick,max}$ an absolute maximum difference between the SOC of brick j of the N bricks and the average SOC;
  $\delta SOC_{ij} = SOC_{ij} - SOC_j \forall j \in N, i \in m$;
  $SOC_{ij}$ is the SOC of the battery cell connected to BPM i of m BPMs of the brick j; and
  $SOC_{MaxCell,j}$ is the absolute maximum difference between the SOC of a battery cell connected to BPM i of m BPMs of the brick j and $SOC_j$.

10. The apparatus of claim 1, wherein each BPM comprises a DC-to-DC converter with switches and the control signal comprises a duty cycle for the switches.

11. The apparatus of claim 1, wherein the battery pack further comprises P modular subsystems, each modular subsystem comprises N bricks, wherein the P modular subsystems are connected in one of series or parallel.

12. An apparatus comprising:
  a battery pack comprising a plurality of P modular subsystems, wherein P is an integer greater than or equal to 1, each modular subsystem k of the P modular subsystems comprising a plurality of N battery bricks ("bricks"), wherein k is an integer between 1 and P and N is an integer greater than or equal to 1, an output of each of the N bricks of the battery pack comprising a direct current ("DC") output voltage, wherein output terminals of each of the N bricks are connected in series and provide a bus voltage, wherein each of the N bricks comprises a plurality of m battery power modules ("BPMs"), wherein m is an integer greater than or equal to 1, each of the m BPMs comprising a DC output voltage, wherein output terminals of each of the m BPMs are connected in parallel and together provide the output voltage of each of the N bricks and each of the m BPMs of a $j^{th}$ brick of the N bricks has an input connected to a battery cell, wherein j is an integer between 1 and N, wherein each of an $i^{th}$ BPM of the m BPMs is controllable to charge and discharge the battery cell connected to the $i^{th}$ BPM;
  a battery brick controller for each of the N bricks of the P modular subsystems, the battery brick controller for each of a $j^{th}$ brick of the N bricks is configured to provide a control signal to each of the m BPMs of the $j^{th}$ brick, wherein a control signal of an $i^{th}$ BPM of the m BPMs of the $j^{th}$ brick is derived from a BPM error signal comprising a battery cell current of the battery cell connected to the $i^{th}$ BPM subtracted from a summation of an average current signal, a local droop current and a balancing current, the balancing current based on a current state-of-charge ("SOC") of the battery cell connected to the $i^{th}$ BPM and a desired SOC for the battery cell connected to the $i^{th}$ BPM; and
  a battery management system ("BMS") configured to derive the balancing current for each of the m BPMs of the N bricks of the P modular subsystems the battery pack.

13. The apparatus of claim 12, wherein, for each BPM of the m BPMs of the N bricks of the P modular subsystems, the BMS derives the balancing current for an $i^{th}$ BPM of the m BPMs of the N bricks of the P modular subsystems of the battery pack from current and voltage measurements from the battery cell connected to the $i^{th}$ BPM, the bus voltage, and a target SOC of the battery pack.

14. The apparatus of claim 12, wherein the local droop current comprises a product of a droop conductance and an error signal derived from an average voltage subtracted from the output voltage of the $j^{th}$ brick of the N bricks controlled by the battery brick controller, wherein the average voltage is the bus voltage divided by NP when the P modular subsystems are connected in series and is the bus voltage divided by N when the P modular subsystems are connected in parallel.

15. The apparatus of claim 12, wherein the average current signal comprises a product of a SOC compensator and a difference between an average SOC and a SOC reference signal, the average SOC comprising a total of the SOC for each battery cell connected to a BPM of the m BPMs of the N bricks of the P modular subsystems of the battery pack divided by the number of BPMs mNP of the battery pack and the SOC reference signal is derived from a target SOC of the battery pack and wherein the SOC reference signal scales linearly with the bus voltage over a first voltage range for charging of the battery cells of the battery pack and scales linearly with the bus voltage over a second voltage range for discharging of the battery cells of the battery pack, wherein the first voltage range is below the second voltage range and the first voltage range and the second voltage range are within an overall voltage regulation range of the bus voltage.

16. The apparatus of claim 12, wherein the balancing current for an $i^{th}$ BPM of a $j^{th}$ brick of a $k^{th}$ modular subsystem is derived from scalar configured to limit output current of the BPMs, the average current signal, a SOC of the battery cells connected to the m BPMs of the $j^{th}$ brick of the $k^{th}$ modular subsystem, and a SOC of the battery cell connected to the $i^{th}$ BPM.

17. The apparatus of claim 16, wherein the average current signal is positive for discharging the battery cells of the battery pack and negative for charging the battery cells of the battery pack and the balancing current for the $i^{th}$ BPM of the m BPMs connected in parallel of a $j^{th}$ brick of the N bricks of a $k^{th}$ modular subsystem is positive when the average current signal is positive and negative.

18. The apparatus of claim 16, wherein the balancing current of the ijk$^{th}$ DPM $\Delta I_{ijk}$ is:

$$\Delta I_{ijk} = \begin{cases} \alpha i_{all} \frac{SOC_k - SOC_{avg}}{\max_{k \in P}\{|SOC_k - SOC_{avg}|\}} + \alpha i_{all} \frac{SOC_{jk} - SOC_k}{\max_{j \in N}\{|SOC_{jk} - SOC_k|\}} + \\ \alpha |i_{all}| \frac{SOC_{ijk} - SOC_{jk}}{\max_{i \in m}\{|SOC_{ijk} - SOC_{jk}|\}}, \text{ Series modular subsystems} \\ \alpha |i_{all}| \frac{SOC_k - SOC_{avg}}{\max_{k \in P}\{|SOC_k - SOC_{avg}|\}} + \alpha i_{all} \frac{SOC_{jk} - SOC_k}{\max_{j \in N}\{|SOC_{jk} - SOC_k|\}} + \\ \alpha |i_{all}| \frac{SOC_{ijk} - SOC_{jk}}{\max_{i \in m}\{|SOC_{ijk} - SOC_{jk}|\}}, \text{ Parallel modular subsystems} \end{cases}$$

where:

$\alpha$ is the scalar;

$i_{all}$ is the average current signal;

$SOC_k$ is the SOC for modular subsystem k of the P modular subsystems of the battery pack;

$SOC_{jk}$ is the SOC for the $j^{th}$ brick of the kth modular subsystem of the battery pack;

$SOC_{ijk}$ is the SOC of the battery cell connected to the $i^{th}$ BPM of $j^{th}$ brick of the $k^{th}$ modular subsystem;

$SOC_{avg}$ is an average SOC of all battery cells of the battery pack;

$\max_{k \in p}\{|SOC_K - SOC_{avg}|\}$ is an absolute maximum difference between the SOC of the $k^{th}$ modular subsystem and the average SOC;

$\max_{j \in N}\{|SOC_{jk} - SOC_K|\}$ is an absolute maximum difference between the SOC of the $j^{th}$ brick of the $k^{th}$ modular subsystem and the SOC of the $k^{th}$ modular subsystem; and $\max_{i \in m}\{|SOC_{ijk} - SOC_{jk}|\}$ is the absolute maximum difference between the SOC of the battery cell connected to the $i^{th}$ BPM of the $j_{th}$ brick of the $k^{th}$ modular subsystem and SOC of the $j^{th}$ brick of the $k^{th}$ modular subsystem.

19. An apparatus comprising:

a battery pack comprising a plurality of N battery bricks ("bricks"), wherein N is an integer greater than or equal to 1, an output of each of the N bricks of the battery pack comprising a direct current ("DC") output voltage, wherein output terminals of each of the N bricks are connected in series and provide a bus voltage, wherein each of the N bricks comprises a plurality of m battery power modules ("BPMs"), wherein m is an integer greater than or equal to 1, each of the m BPMs comprising a DC output voltage, wherein output terminals of each of the m BPMs is connected in parallel and together provide the output voltage of each of the N bricks and each of the m BPMs of a $j^{th}$ brick of the N bricks has an input connected to a battery cell, wherein j is an integer between 1 and N, wherein each of an $i^{th}$ BPM of the m BPMs is controllable to charge and discharge the battery cell connected to the $i^{th}$ BPM;

a battery brick controller for each of the N bricks, the battery brick controller for each of a $j^{th}$ brick of the N bricks is configured to provide a control signal to each of the m BPMs of the $j^{th}$ brick, wherein a control signal of an $i^{th}$ BPM of the m BPMs of the $j^{th}$ brick is derived from a BPM error signal comprising a battery cell current of the battery cell connected to the $i^{th}$ BPM subtracted from a summation of an average current signal, a local droop current and a balancing current, the balancing current based on a current state-of-charge ("SOC") of the battery cell connected to the $i^{th}$ BPM and a desired SOC for the battery cell connected to the $i^{th}$ BPM; and a battery management system ("BMS") configured to derive the balancing current for each of the m BPMs of the N bricks of the battery pack, wherein, for each BPM of the m BPMs of the N bricks, the BMS derives the balancing current for an $i^{th}$ BPM of the m BPMs of the N bricks of the battery pack from current and voltage measurements from the battery cell connected to the $i^{th}$ BPM, the bus voltage, and a target SOC of the battery pack, wherein the local droop current comprises a product of a droop conductance and an error signal derived from an average voltage subtracted from the output voltage of the $j^{th}$ brick of the N bricks controlled by the battery brick controller, wherein the average voltage comprises the bus voltage divided by the number of bricks N, and wherein the average current signal comprises a product of a SOC compensator and a difference between an average SOC and a SOC reference signal, the average SOC comprising a total of the SOC for each battery cell connected to a BPM of the m BPMs of the N bricks of the battery pack divided by the number of BPMs mN of the battery pack and the SOC reference signal is derived from a target SOC of the battery pack.

20. The apparatus of claim 19, wherein the balancing current of a DPM$_{ij}\Delta I_{ij}$ is:

$$\Delta I_{ij} = \alpha \cdot i_{all} \frac{\delta SOC_j}{SOC_{brick,max}} + \alpha \cdot |i_{all}| \frac{\delta SOC_{ij}}{SOC_{MaxCell,j}} \forall j \in N, \in m$$

where:

$\alpha$ is the scalar;

$i_{all}$ is the average current signal;

$\delta SOC_j = SOC_j - SOC_{avg} \forall j \in N$;

$SOC_j$ is the SOC for brick j of the N bricks of the battery pack;

$SOC_{avg}$ is an average SOC of all battery cells of the battery pack;

$SOC_{brick,max}$ an absolute maximum difference between the SOC of brick j of the N bricks and the average SOC;

$\delta SOC_{ij} = SOC_{ij} - SOC_j \forall j \in N, i \in m$;

$SOC_{ij}$ is the SOC of the battery cell connected to BPM i of m BPMs of the brick j; and $SOC_{MaxCell,j}$ is the absolute maximum difference between the SOC of a battery cell connected to BPM i of m BPMs of the brick j and $SOC_j$.

* * * * *

UNITED STATES PATENT AND TRADEMARK OFFICE
CERTIFICATE OF CORRECTION

| | | |
|---|---|---|
| PATENT NO. | : 12,230,982 B2 | Page 1 of 1 |
| APPLICATION NO. | : 17/529962 | |
| DATED | : February 18, 2025 | |
| INVENTOR(S) | : Mohamed Ahmed Kamel Ahmed, Regan A. Zane and Dragan Maksimovic | |

It is certified that error appears in the above-identified patent and that said Letters Patent is hereby corrected as shown below:

On the Title Page (12):
Please delete "United States Patent Kamel Ahmed et al." and insert --United States Patent Ahmed et al.--.

Signed and Sealed this
Twenty-sixth Day of August, 2025

Coke Morgan Stewart
*Acting Director of the United States Patent and Trademark Office*